(12) United States Patent
Enslow

(10) Patent No.: US 11,034,083 B2
(45) Date of Patent: Jun. 15, 2021

(54) THREE DIMENSIONAL PRINTING SYSTEM THAT AUTOMATICALLY REMOVES PARTICLES FROM BUILD PLANE

(71) Applicant: 3D Systems, Inc., Rock Hill, SC (US)

(72) Inventor: Andrew Enslow, Escondido, CA (US)

(73) Assignee: 3D Systems, Inc., Rock Hill, SC (US)

( * ) Notice: Subject to any disclaimer, the term of this patent is extended or adjusted under 35 U.S.C. 154(b) by 190 days.

(21) Appl. No.: 16/239,041

(22) Filed: Jan. 3, 2019

(65) Prior Publication Data

US 2019/0152136 A1    May 23, 2019

Related U.S. Application Data

(63) Continuation-in-part of application No. 15/926,148, filed on Mar. 20, 2018, now Pat. No. 10,960,602.
(Continued)

(51) Int. Cl.
| | |
|---|---|
| *B29C 64/135* | (2017.01) |
| *B29C 64/40* | (2017.01) |
| *B29C 64/35* | (2017.01) |
| *B29C 64/245* | (2017.01) |
| *B33Y 10/00* | (2015.01) |
| *B33Y 30/00* | (2015.01) |

(Continued)

(52) U.S. Cl.
CPC .......... *B29C 64/135* (2017.08); *B29C 64/223* (2017.08); *B29C 64/245* (2017.08); *B29C 64/35* (2017.08); *B29C 64/393* (2017.08); *B29C 64/40* (2017.08); *B33Y 10/00* (2014.12); *B33Y 30/00* (2014.12); *B33Y 40/00* (2014.12); *B33Y 50/02* (2014.12)

(58) Field of Classification Search
CPC .......... B29C 64/124–135; B29C 64/40; B29C 64/245; B29C 64/35
See application file for complete search history.

(56) References Cited

U.S. PATENT DOCUMENTS

| | | |
|---|---|---|
| 9,034,237 B2 | 5/2015 | Sperry et al. |
| 2015/0145171 A1 | 5/2015 | Walker et al. |
| (Continued) | | |

OTHER PUBLICATIONS

PCT International Search Report the International Searching Authority for PCT/US2017/060639, dated Feb. 12, 2018 (6 pages).
(Continued)

*Primary Examiner* — Marc C Howell
*Assistant Examiner* — John J Derusso

(57) ABSTRACT

A three dimensional printing system includes a resin vessel, a light engine, a movement mechanism, a support fixture, and a controller. The resin vessel is for containing a photocurable resin and has a lower portion with a transparent sheet. The light engine is configured to selectively project radiation up through the transparent sheet and over a build plane. The support fixture is coupled to the movement mechanism and has a lower rim that surrounds a central opening and faces the transparent sheet. The controller is configured to: (1) operate the movement mechanism to position the rim at an operating distance from the transparent sheet, (2) operate the light engine and the movement mechanism to form a particle trapping sheet that spans the central opening, and (3) operate the light engine and the movement mechanism to form the three dimensional article.

19 Claims, 18 Drawing Sheets

Related U.S. Application Data

(60) Provisional application No. 62/477,747, filed on Mar. 28, 2017.

(51) Int. Cl.
*B33Y 40/00* (2020.01)
*B29C 64/223* (2017.01)
*B29C 64/393* (2017.01)
*B33Y 50/02* (2015.01)

(56) References Cited

U.S. PATENT DOCUMENTS

2017/0057177 A1    3/2017  Ferguson et al.
2018/0281287 A1*  10/2018  Tanner .................. B33Y 50/02
2019/0118476 A1*   4/2019  Damiano .............. B29C 64/227

OTHER PUBLICATIONS

PCT Written Opinion of the International Searching Authority for PCT/US2017/060639, dated Feb. 12, 2018 (7 pages).

* cited by examiner

US 11,034,083 B2

THREE DIMENSIONAL PRINTING SYSTEM THAT AUTOMATICALLY REMOVES PARTICLES FROM BUILD PLANE

CROSS REFERENCE TO RELATED APPLICATIONS

This non-provisional patent application is a continuation-in-part of U.S. application Ser. No. 15/926,148, Entitled "THREE DIMENSIONAL PRINTING SYSTEM THAT AUTOMATICALLY REMOVES PARTICLES FROM BUILD PLANE", by Christopher Tanner et al., filed on Mar. 20, 2018 which is hereby incorporated by reference. U.S. application Ser. No. 15/926,148 claims priority to U.S. Provisional Application Ser. No. 62/477,747, Entitled "THREE DIMENSIONAL PRINTING SYSTEM THAT AUTOMATICALLY REMOVES PARTICLES FROM BUILD PLANE" by Christopher Tanner et al., filed on Mar. 28, 2017, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present disclosure improves the quality of a three dimensional (3D) article of manufacture through the removal of particles extending into a build plane.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a containment vessel holding the photocurable resin, a movement mechanism coupled to a support surface, and a controllable light engine. The stereolithography system forms a three dimensional (3D) article of manufacture by selectively curing layers of the photocurable resin.

In one system embodiment the vessel includes a transparent sheet that forms part of a lower surface of the vessel. The support surface is positioned above and in facing relation with the transparent sheet. The following steps take place: (1) The movement mechanism positions the support surface whereby a thin layer of the photocurable resin resides between the support surface and the transparent sheet. (2) The light engine transmits pixelated light up through the transparent sheet to selectively cure a layer of the photocurable resin proximate to and onto the support surface. The focus of the pixelated light curing is referred to a "build plane." (3) The movement mechanism then incrementally raises the support surface. Steps (2) and (3) are repeated to form a three dimensional (3D) article of manufacture having a lower face in facing relation with the transparent sheet.

One difficulty is an accumulation of particles on the transparent sheet and/or within the photocurable resin. The particles are formed from the photocurable resin and are the result of portions of a fabricated article that may break off and settle into the resin. A required gap between the build plane and the transparent sheet is very small. The lower face of the support surface or three dimensional article of manufacture must therefore be positioned very close (a small fraction of a millimeter typically) to the transparent sheet in order to perform step (2) above. During this positioning, the accumulated particles can become compressed between the transparent sheet and the lower face. These particles can be compressed and can damage the transparent sheet and become embedded in the three dimensional article of manufacture, possibly creating a defect. Damage to the transparent sheet will affect its light transmissive properties and therefore impact the quality of all subsequent fabrication. The transparent sheet is also expensive and disruptive to replace. What is needed is a system and method to facilitate particle removal.

SUMMARY

Figure 1:
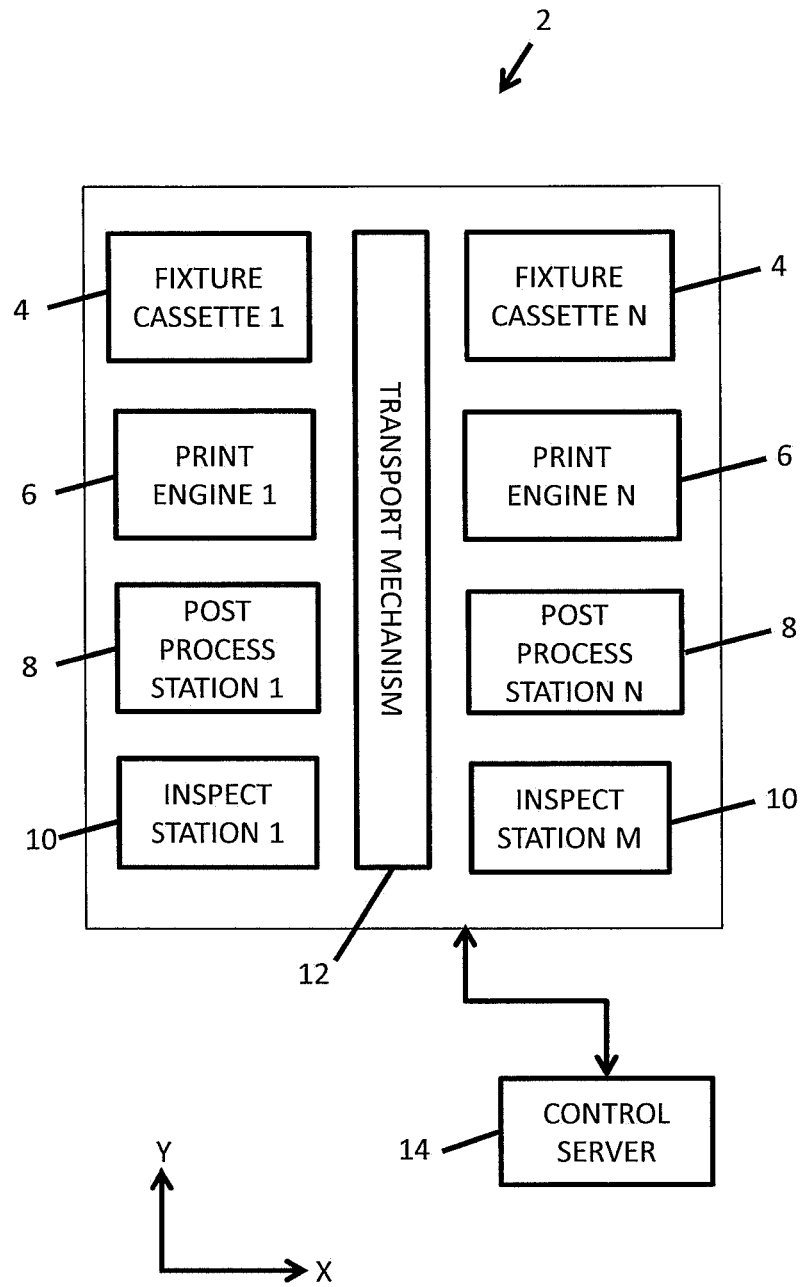
FIG. 1 is a block diagram schematic of an exemplary embodiment of a three dimensional printing system for forming a three dimensional article of manufacture.

In a first aspect of the disclosure, a three dimensional printing system is for manufacturing a three dimensional article. The three dimensional printing system includes a resin vessel, a light engine, a movement mechanism, a support fixture, and a controller. The resin vessel is for containing a photocurable resin and has a lower portion with a transparent sheet. The light engine is configured to selectively project radiation up through the transparent sheet and over a build plane. The support fixture is coupled to the movement mechanism and includes an upper portion for coupling to the movement mechanism, a lower portion with a rim surrounding a central opening, and a side wall coupling the upper and lower portions. The controller is configured to: (1) operate the movement mechanism to position the rim at an operating distance from the transparent sheet, (2) operate the light engine and the movement mechanism to form a particle trapping sheet that spans the central opening, and (3) operate the light engine and the movement mechanism to form the three dimensional article attached to and below the particle trapping sheet.

In one implementation the controller is further configured to operate the light engine to form a peripheral support along the rim after positioning the rim at the operating distance but before forming the particle trapping sheet. The peripheral support can have a shape much like a rectangular frame. Alternatively, the peripheral support can have a zig-zag shape alternating shape along the rim.

In another implementation, the particle trapping sheet includes tapering features that taper between the particle trapping sheet and the three dimensional article to facilitate removal of the three dimensional article from the particle trapping sheet.

In yet another implementation, the particle trapping sheet defines an array of conduits to allow resin to flow through the particle trapping sheet and through the central opening as the movement mechanism raises and lowers the support fixture. The conduits individually are at least partially oriented at an oblique angle with respect to a vertical axis to facilitate complete trapping of particles.

In a further implementation, the particle trapping sheet defines an array of conduits to allow resin to flow through the particle trapping sheet and through the central opening as the movement mechanism raises and lowers the support fixture. The conduits individually define an upper opening on an upper side of the particle trapping sheet and a lower opening on a lower side of the particle trapping sheet, the upper and lower openings are laterally offset to facilitate trapping of particles.

In a yet further implementation, the particle trapping sheet has at least a vertical thickness of one millimeter to provide structural support for the three dimensional article.

In another implementation, the particle trapping sheet includes a plurality of support ribs to provide structural support for the three dimensional article. The support ribs can be defined between an upper sheet and a lower sheet that are thinner vertically than the support ribs.

In a second aspect of the disclosure, a three dimensional printing system includes a resin vessel, a light engine, a movement mechanism, a fixture, and a controller. The resin vessel is for containing a photocurable resin and has a lower portion with a transparent sheet. The light engine is configured to selectively project radiation up through the transparent sheet and over a build plane. The fixture is coupled to the movement mechanism and has a lower face that faces the transparent sheet. The controller is configured to operate the light engine to solidify a particle trapping sheet proximate to the build plane thereby trapping particles that extend upwardly from the transparent sheet into the build plane.

In one implementation the particle trapping sheet is solidified and formed while the fixture is in a raised position above the resin vessel in which the lower face of the fixture is not in contact with the resin.

In another implementation the controller is configured to pause operation of the print engine to allow removal of the particle trapping sheet from the resin vessel before the lower face of the fixture is lowered into the resin.

In yet another implementation the three dimensional printing system includes a user interface device. The controller is configured to display instructions on a user interface that instruct a user to remove the particle trapping sheet from the resin vessel.

In a further implementation the three dimensional printing system includes a user interface device. The controller is configured to pause operation of the print engine to allow removal of the particle trapping sheet from the resin vessel before the lower face of the fixture is lowered into the resin. The controller is also configured to receive instructions from a user interface to restart operation of the print engine. The controller is then configured to lower the fixture until the lower face is positioned within the resin and proximate to the build plane and operate the light engine and movement mechanism to manufacture the three dimensional article onto the lower face.

In a third aspect of the disclosure, a three dimensional printing system includes a print engine, a fixture, and a controller. The print engine further includes a vessel, a light engine, and a movement mechanism. The vessel is for containing a photocurable resin and has a lower portion with a transparent sheet defining at least part of a lower surface of the vessel. The light engine is configured to project radiation up through the transparent sheet over a lateral build plane which defines a maximum addressable lateral range of the light engine. The fixture has a lower face that faces downwardly. The controller is configured to: (1) position the lower face of the fixture at the build plane which is at an operating distance from the transparent sheet, and (2) operate the light engine and movement mechanism to solidify a particle trapping sheet proximate to the transparent sheet and substantially spanning the build plane and to thereby trap particles that are present along the build plane.

In one implementation the controller includes a processor coupled to an information storage device. The information storage device includes a non-transient or non-volatile storage device storing instructions that, when executed by the processor, control the light engine and the movement mechanism. The controller can be at one location or distributed among a plurality of locations in the printing system. In a first embodiment the controller is entirely within the print engine which operates as a standalone three dimensional printer. In a second embodiment the controller includes a control server that controls the overall printing system and a print engine controller that is located within the print engine. In the second embodiment the three dimensional printing system includes various modules including one or more of a fixture cassette, a post processing station, an inspection station, and a robotic transport mechanism for transporting the fixture between the modules.

In another implementation the fixture has a lower end defining a recessed surface from which a plurality of projections extend downwardly from the recessed surface to distal tips. The particle trapping sheet defines an upper surface coupled to the distal tips and an opposed lower surface. The opposed lower surface further defines a plurality of tapering features. The controller is further configured to operate the light engine and the movement mechanism to form a three dimensional article of manufacture that is coupled to the tapering features. The tapering features minimize a surface area of connection between the three dimensional article of manufacture and the particle trapping sheet in order to facilitate the later physical separation of the particle trapping sheet from the three dimensional article of manufacture.

In yet another implementation the printing system includes a transport mechanism and the controller is further configured to: (3) unload the fixture from the print engine, (4) load a new fixture into the printing system, and (5) operate the light engine and the movement mechanism to form a three dimensional article of manufacture. The fixture used in steps (1) and (2) is a disposable fixture that is used exclusively for forming the particle trapping sheet and removing particles. The disposable fixture has a lower end defining a recessed surface from which a plurality of projections extend downwardly from the recessed surface to distal tips. An upper surface of the particle trapping sheet is formed onto the distal tips. The fixture used in steps (3) to (5) is a reusable fixture that is used entirely for forming three dimensional articles of manufacture.

In a further implementation the controller is configured to operate the light engine and the movement mechanism to form a three dimensional article of manufacture onto the fixture before forming the particle trapping sheet. The particle trapping sheet includes a plurality of upwardly extending extensions that form a framework for supporting the particle trapping sheet onto the three dimensional article of manufacture.

In a yet further implementation the particle trapping sheet has an upper surface and an opposed lower surface. The particle trapping sheet defines at least one opening passing from the upper surface to the opposed lower surface to provide flow of photocurable resin therethrough when the movement mechanism is raising or lowering the fixture. Preferably the at least one opening includes an array or plurality of openings that are laterally distributed across the particle trapping sheet.

In another implementation the particle trapping sheet includes a thin parallelepiped portion covering most or essentially all of the lateral area of the build plane. The thickness is minimized so as to minimize a required amount of resin for fabricating the particle trapping sheet. The particle trapping sheet also includes a framework of ribs or thickened portions to provide mechanical support for the thin parallelepiped portion. In some embodiments the particle trapping sheet includes tapering features and/or extensions for coupling to a three dimensional article of manufacture. The coupling occurs at a narrowed distal tip. The tapering features and/or extensions can be laterally aligned with the ribs so as to improve structural integrity. The thin parallelepiped portion can define openings therethrough to allow a flow of photocurable resin therethrough to facilitate vertical movement of the fixture.

DETAILED DESCRIPTION OF THE PREFERRED EMBODIMENTS

FIG. 1 is a block diagram schematic of an exemplary embodiment of a three dimensional printing system 2 for forming three dimensional articles of manufacture. Three dimensional printing system 2 includes fixture cassettes 4, print engines 6, post-processing stations 8, inspection stations 10, a transport mechanism 12, and a control server 14.

A fixture cassette 4 stores a stack of fixtures that are utilized in print engine 6, post-process stations 8, and inspection station 10. In some embodiments there are different fixtures stored in different fixture cassettes 4. One stack of fixtures can be disposable and utilized for a particle removal process. Another stack of fixtures can be reusable and utilized for the formation and transport of a three dimensional article of manufacture.

An embodiment of print engine 6 will be described in further detail with respect to FIGS. 2A, 2B, and 2C. Post process stations 8 are for added processes for a three dimensional article of manufacture after it is formed. Post processing stations can include rinsing and cleaning stations, drying stations, and curing stations, to name some examples. Inspection stations 10 can be utilized to inspect for defects and/or to measure critical dimensions for a three dimensional article of manufacture after fabrication and post processing is complete.

Transport mechanism 12 is configured to pick up a fixture from a fixture cassette 4 and to transfer it to a print engine 6. Transport mechanism 12 also transfers the fixture to the post process stations 8 and to the inspection stations 10. In one embodiment, the transport mechanism includes a robotic gripper that can move in three axes.

Figure 2A:
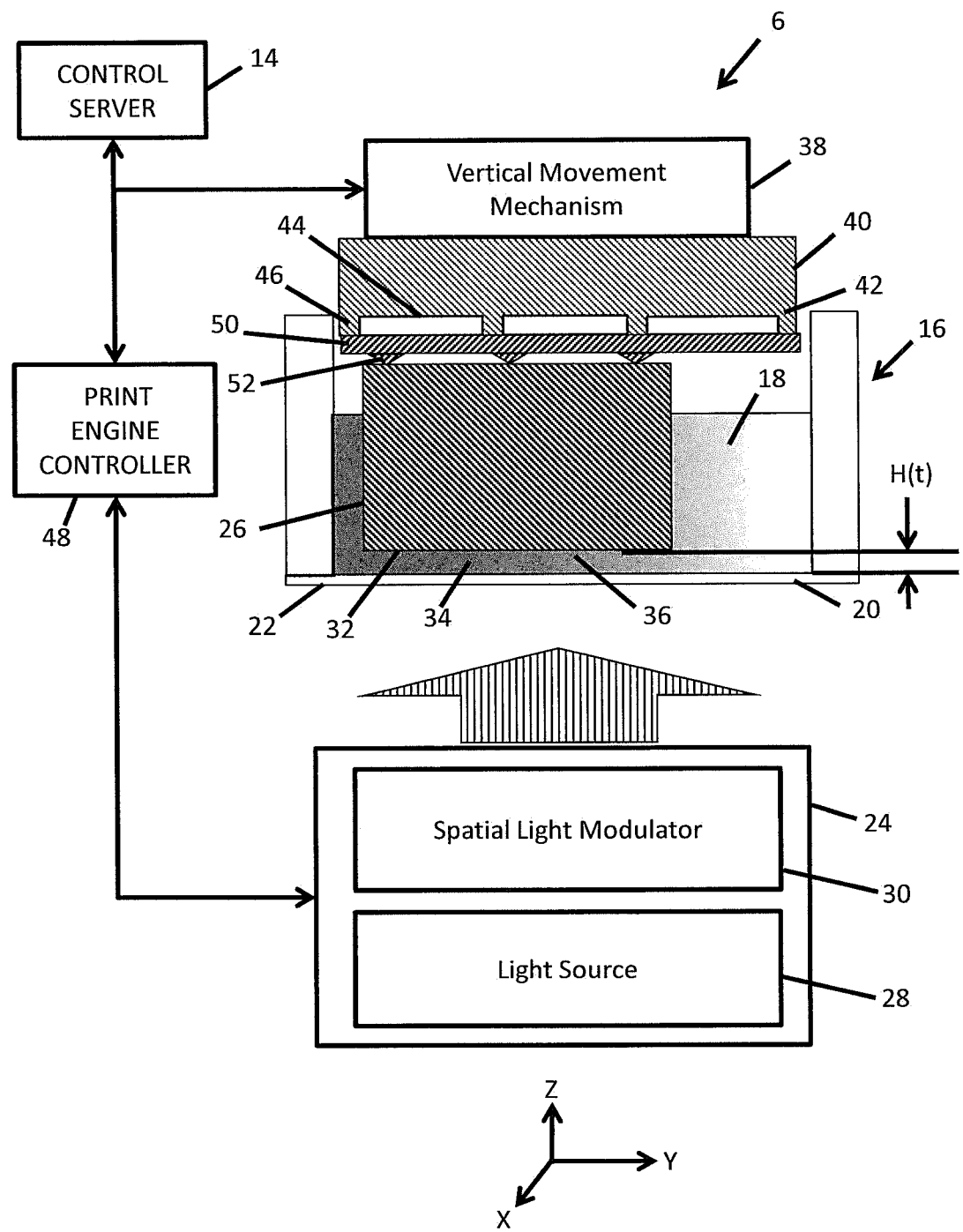
FIG. 2A is a block diagram schematic depicting a print engine and a first embodiment of a configuration whereby the print engine traps deleterious particles.

FIG. 2A is a schematic block diagram depicting print engine 6 and a first embodiment through which print engine 6 removes deleterious particles. In this and other figures, mutually perpendicular axes X, Y and Z will be used. Axes X and Y are lateral axes. In some embodiments X and Y are also horizontal axes. Axis Z is a central axis. In some embodiments Z is a vertical axis. In some embodiments the direction +Z is generally upward and the direction −Z is generally downward.

Print engine 6 includes a vessel 16 containing photocurable resin 18. Vessel 16 includes a transparent sheet 20 that defines at least a portion of a lower surface 22 of vessel 16. A light engine 24 is disposed to project light up through the transparent sheet 20 to selectively cure the photocurable resin 18 during formation of a three dimensional article of manufacture 26. Light engine 24 includes light source 28 and spatial light modulator 30.

Between a lower face 32 of the three dimensional article of manufacture 26 and the transparent sheet 20 is a thin layer 34 of photocurable resin 18. As the light engine 24 operates, a portion of the thin layer 34 of photocurable resin 18 is cured and solidified at and proximate to a build plane 36. Build plane 36 defines a lateral extent (along X and Y) of a layer of photocure resin that the light engine 24 is capable of curing when forming the three dimensional article of manufacture 26.

Print engine 6 also includes a vertical movement mechanism 38 coupled to a fixture 40. Fixture 40 is for supporting the three dimensional article of manufacture 26. Fixture 40 includes a lower end 42 having an upwardly recessed surface 44 and projections 46 that extend downwardly from the recessed surface 44.

Print engine 6 includes print engine controller 48 that is under control of control server 14 and is coupled to light engine 24 and to vertical movement mechanism 38. In the illustrated embodiment, the print engine controller 48 controls the light engine 24 and the movement mechanism 38 to form a particle trapping sheet 50 before forming the three dimensional article of manufacture 26. The particle trapping sheet 50 is first formed at and proximate to the build plane 36 and just above the transparent sheet 20. During formation of the particle trapping sheet 50 the deleterious particulates are "bound up" in the particle trapping sheet 50 so that they are removed from the vicinity of the transparent sheet 20 to prevent build-up of particles and subsequent damage. The lateral extent of the particle trapping sheet 50 is preferably substantially the entire build plane 36.

The particle trapping sheet 50 includes tapering features 52 that taper between the particle trapping sheet 50 and the three dimensional article of manufacture 26. These tapering feature 52 facilitate removal of the particle trapping sheet 50 from the three dimensional article of manufacture 26 after processing is complete.

Figure 2B:
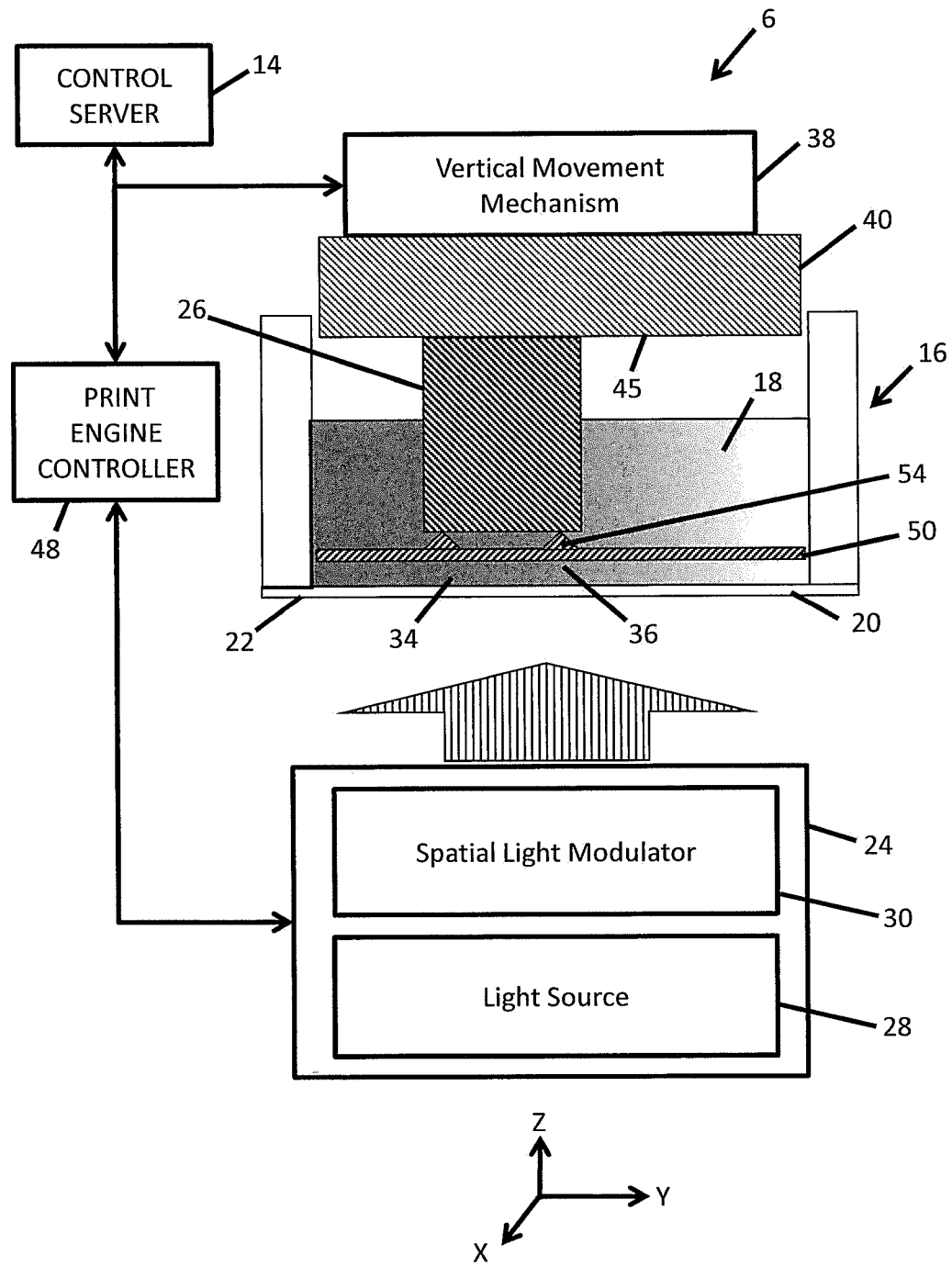
FIG. 2B is a block diagram schematic depicting a print engine and a second embodiment of a configuration whereby the print engine traps deleterious particles.

FIG. 2B is a schematic block diagram depicting print engine 6 and a second embodiment through which print engine 6 removes deleterious particles. In comparing FIGS. 2A and 2B, like reference numerals indicate like elements. The discussion for FIG. 2B will be limited to those features that necessarily make it different than FIG. 2A.

In the illustrated embodiment of FIG. 2B, the print engine controller 48 controls the light engine 24 and the movement mechanism 38 to form a three dimensional article of manufacture 26 before forming a particle trapping sheet 50. The particle trapping sheet 50 includes extensions 54 that form a framework for coupling the particle trapping sheet 50 to the three dimensional article of manufacture 26. As with FIG. 2A, the particle trapping sheet 50 preferably covers the entire build plane 36 of light engine 24.

Figure 2C:
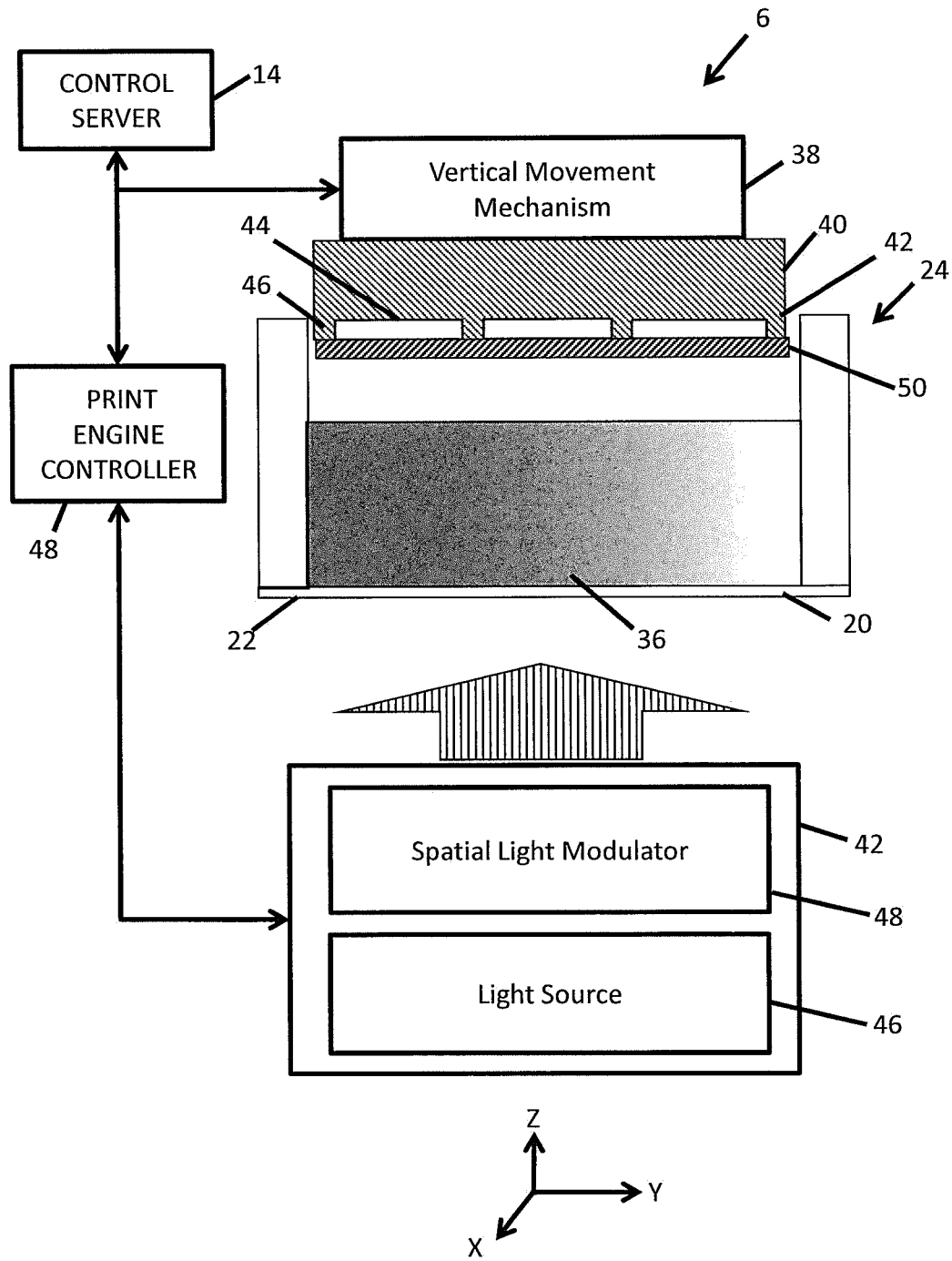
FIG. 2C is a block diagram schematic depicting a print engine and a third embodiment of a configuration whereby the print engine traps deleterious particles.

FIG. 2C is a schematic block diagram depicting print engine 6 and a third embodiment through which print engine 6 removes deleterious particles. In comparing FIGS. 2A, 2B, and 2C, like reference numerals indicate like elements. The discussion for FIG. 2C will be limited to those features that necessarily make it different than FIGS. 2A and 2C.

In the illustrated embodiment of FIG. 2C, the fixture 40 is a disposable fixture 40 that is used entirely for forming the particle trapping sheet 50 to remove the deleterious particles. Other than being disposable, the fixture 40 is similar to the fixture 40 illustrated with respect to FIG. 2A and includes the upwardly recessed surface 44 from which the projections 46 extend downwardly.

Figure 3:
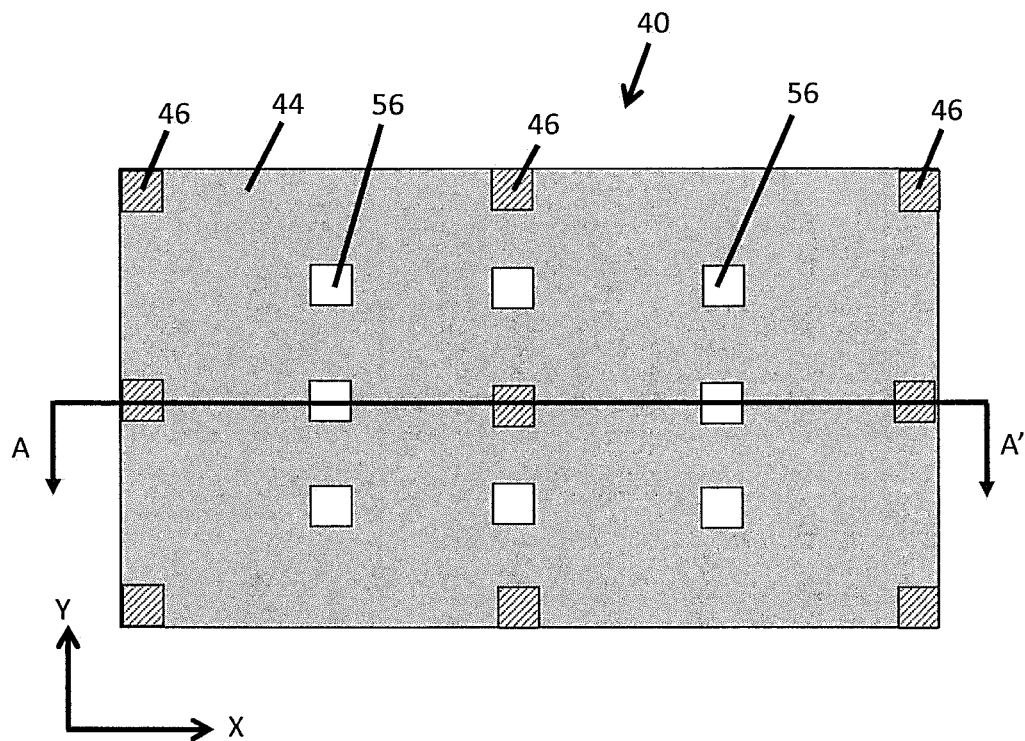
FIG. 3 is a plan view schematic of an exemplary fixture for supporting a particle trapping sheet.

FIG. 3 is a plan view schematic of fixture 40 looking upwardly in the +Z direction. The fixture 40 is shown having a recessed surface 44 from which projections 46 extend in the downward −Z direction. While the illustrated embodiment depicts nine projections 46 it is to be understood that any number of projections 46 can be employed. The use of closely spaced projections 46 can allow a reduction in the thickness and rigidity of the particle trapping sheet 50 because an unsupported distance is thereby reduced. The fixture 40 also includes openings 56 for allowing the photocurable resin 18 to pass through the fixture 40 as it is raised and lowered in the vessel 16.

Figure 4:
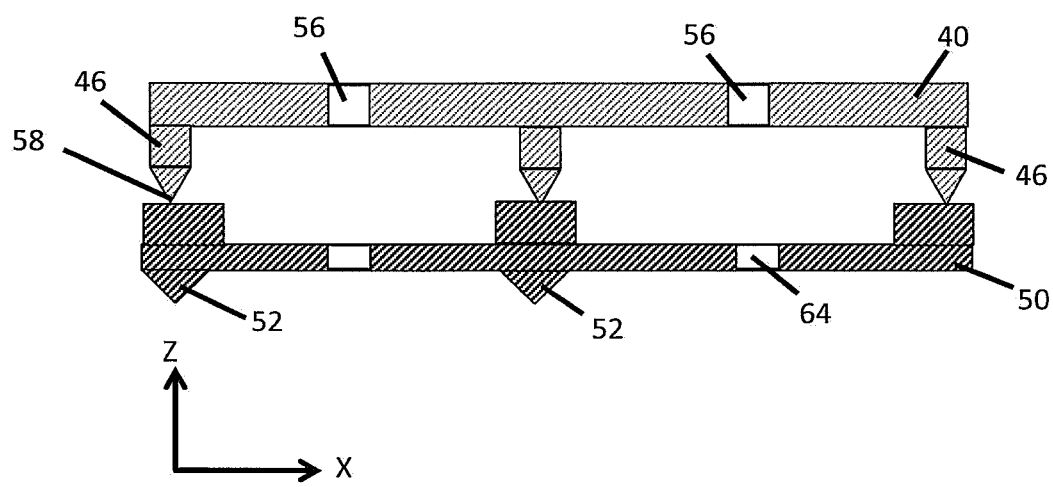
FIG. 4 is a sectional view taken from AA' of FIG. 3 with an exemplary particle trapping sheet included.

FIG. 4 is a cross-sectional view of fixture 40 taken through AA' of FIG. 3. FIG. 4 also includes the particle trapping sheet 50 which has been formed onto the projections 46 of the fixture 40. The projections 46 taper in downward −Z direction toward a distal end 58. Having a distal end 58 with a smaller cross sectional area reduces the impact of the projections 46 upon particles that are proximate to the transparent sheet 20.

Figure 5:
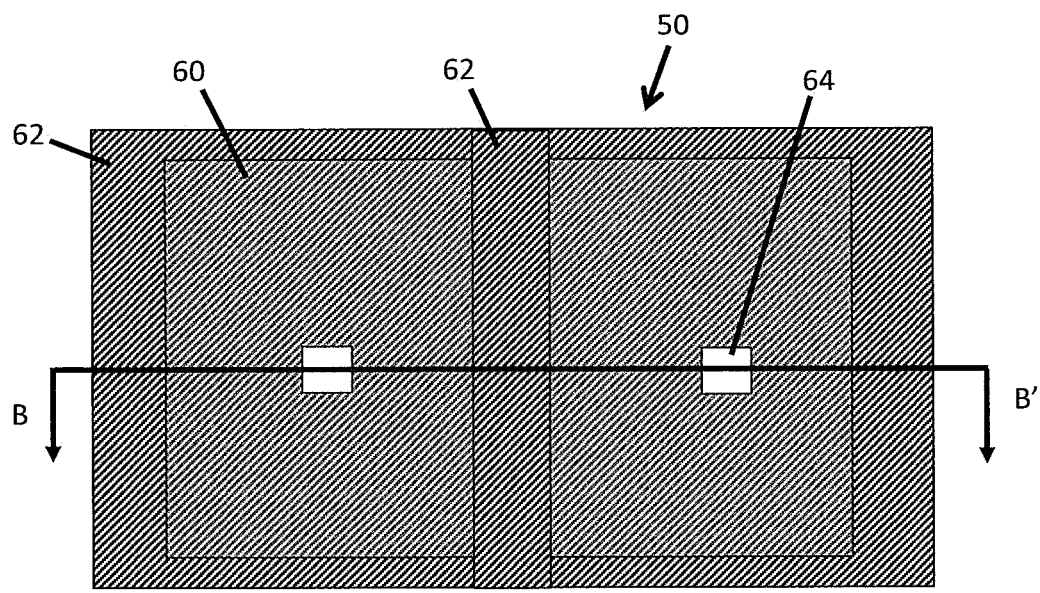
FIG. 5 is a schematic plan view of an exemplary particle trapping sheet.
Figure 5A:
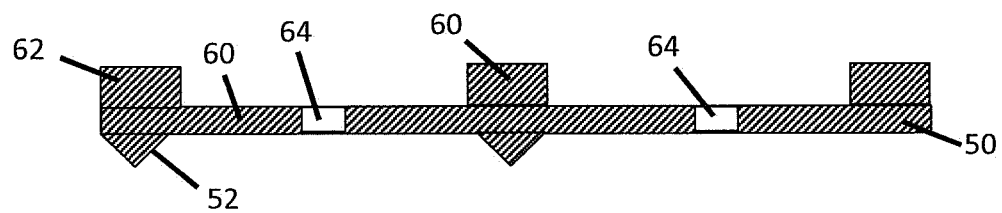
FIG. 5A is a cross sectional view of an exemplary particle trapping sheet taken through BB' of FIG. 5. This particle trapping sheet embodiment corresponds to FIG. 2A.

FIG. 5 is a schematic plan view of an exemplary particle trapping sheet 50. FIG. 5A is a cross section of a first embodiment of the particle trapping sheet 50 that corresponds to the embodiment depicted in FIG. 2A. The particle trapping sheet 50 includes a thin parallelepiped portion 60 covering most or essentially all of a lateral area of the build plane 36. Minimizing the thickness of the thin parallelepiped portion 60 minimizes an amount of photocurable resin required to fabricate the particle trapping sheet 50. The particle trapping sheet 50 also includes thicker sections or ribs 62 that form a frame for supporting the thin parallelepiped portion 60. The particle trapping sheet 50 also includes tapering features 52 for attachment to the three dimensional article of manufacture 26. The tapering geometry of the tapering features 52 minimizes a lateral area of contact between the particle trapping sheet 50 and the three dimensional article of manufacture 26 to facilitate their later separation. The tapering features 52 are preferably laterally aligned with ribs 62 to improve structural integrity. The thin parallelepiped portion 60 also defines openings 64 that allow the flow of the photocurable resin 18 as the particle trapping sheet 50 is raised or lowered in the vessel 16. In this embodiment the particle trapping sheet 50 is attached to the fixture 40 at an upper side and to the three dimensional article of manufacture at a lower side defined by the tapering features 52 as in FIG. 2A.

While only a few openings 64 are shown, it is to be understood that a large number of such openings 64 can be defined. The openings can be angled or stepped whereby particles are trapped at the lateral positions of the openings 64. With a large number of openings 64, they can have a relatively small lateral dimensions to further enhance particle trapping in their vicinity.

Figure 5B:
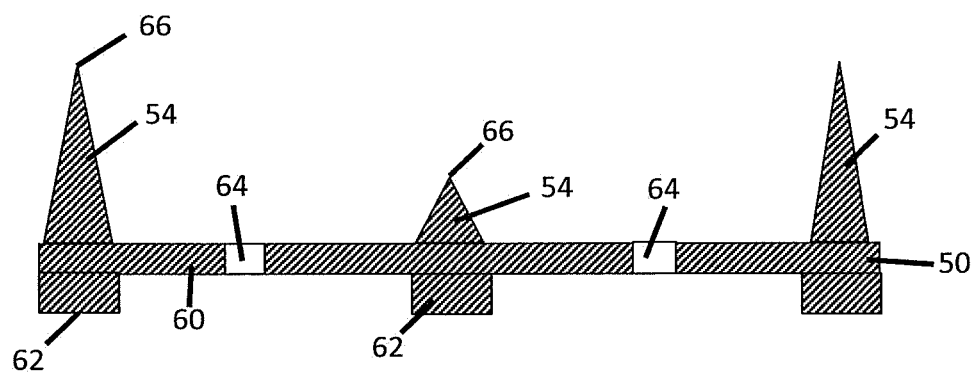
FIG. 5B is a cross sectional view of an exemplary particle trapping sheet taken through BB' of FIG. 5. This particle trapping sheet embodiment corresponds to FIG. 2B.

FIG. 5B is a cross section of a second embodiment of the particle trapping sheet 50 that corresponds to the embodiment depicted in FIG. 2B. In comparing the embodiment of FIGS. 5A and 5B, like element numbers corresponding to like features. Therefore this discussion will focus on differences. The illustrated particle trapping sheet 50 includes extensions 54 for coupling the particle trapping sheet 50 to a lower side of the three dimensional article of manufacture 26. The extensions 54 may vary greatly in a vertical extent in Z according to a geometry of the three dimensional article of manufacture 26. Distal ends 66 of the extensions 54 are of a minimal cross sectional area to facilitate the separation of the particle trapping sheet 50 from the three dimensional article of manufacture 26. Preferably the extensions 54 are laterally aligned with ribs 62 to improve structural integrity.

Figure 6A:
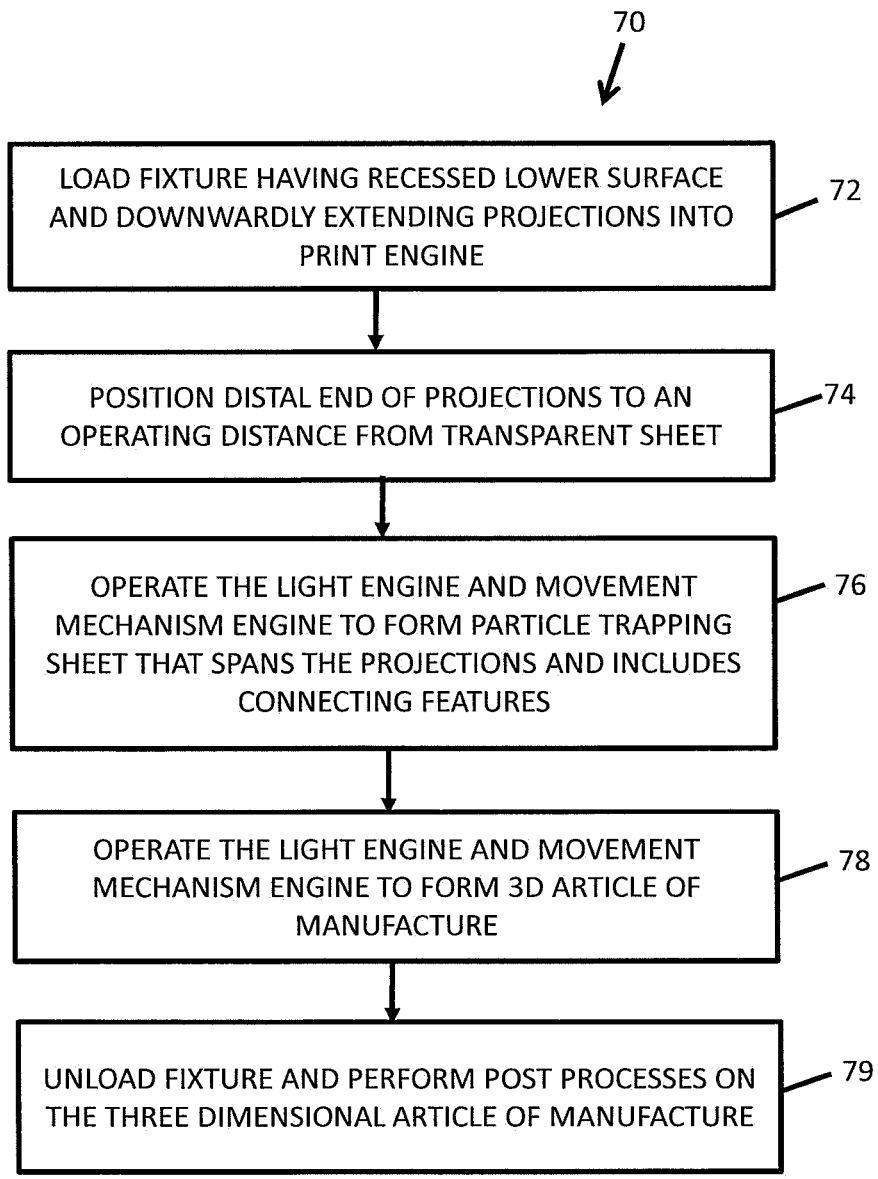
FIG. 6A is a flowchart depicting a first embodiment of a process for operating printing system 2 which corresponds to FIG. 2A.

FIG. 6A is a flowchart depicting a process 70 for operating printing system 2 to fabricate a three dimensional article of manufacture 26. All steps of this process are executed by control server 14 and print engine controller 48 that control portions of printing system 2 and print engine 6. Process 70 corresponds to the description of FIG. 2A.

According to step 72, the transport mechanism 12 retrieves a fixture 40 from a fixture cassette 4 and loads it into a print engine 6. The fixture 40 is an embodiment similar to that discussed with respect to FIG. 2A, FIG. 3, and/or FIG. 4. Upon loading the fixture 40 into print engine 6, the movement mechanism 38 can engage and vertically position the fixture 40.

According to step 74, the movement mechanism 38 lowers and positions the fixture 40 whereby the distal ends 58 of projections 46 are positioned at build plane 36. Build plane 36 is at an operating distance from the transparent sheet 20.

According to step 76, the print engine controller 48 operates the light engine 24 and the vertical movement mechanism 38 to form a particle trapping sheet 50 as is illustrated in FIG. 2A, FIG. 4, or FIG. 5A. The particle trapping sheet 50 preferably spans essentially the entire build plane 36 and is coupled to all of the projections 46. Formation of the particle trapping sheet traps loose particles that are primarily solidified photocurable resin. Also as part of step 76, the connecting features 52 are formed that taper downwardly.

According to step 78, the print engine controller 48 operates the light engine 24 and the vertical movement mechanism 38 to form a three dimensional article of manufacture 26 that couples to the connecting features 52. A lateral cross sectional area over which the connecting features 52 couple to the three dimensional article of manufacture 26 is preferably minimized to facilitate later separation.

According to step 79, the transport mechanism unloads the fixture 40 from the print engine 6 and additional processes are performed. These additional processes can include post processing, inspection, and removal of the particle trapping sheet 50 from the three dimensional article of manufacture 26. In one embodiment the transport mechanism 12 sequentially transfers the fixture 40 to different post process stations 8 and inspection stations 10. When the particle trapping sheet 50 is removed it separates along the lateral area between the connecting features 52 and the three dimensional article of manufacture 26.

In an alternative embodiment the print engine 6 is a standalone unit and steps 72 and 79 are performed manually. This includes manual loading and unloading of fixture 40 as well as cleaning, drying, UV curing, inspection, and removal of the particle trapping sheet 50.

Figure 6B:
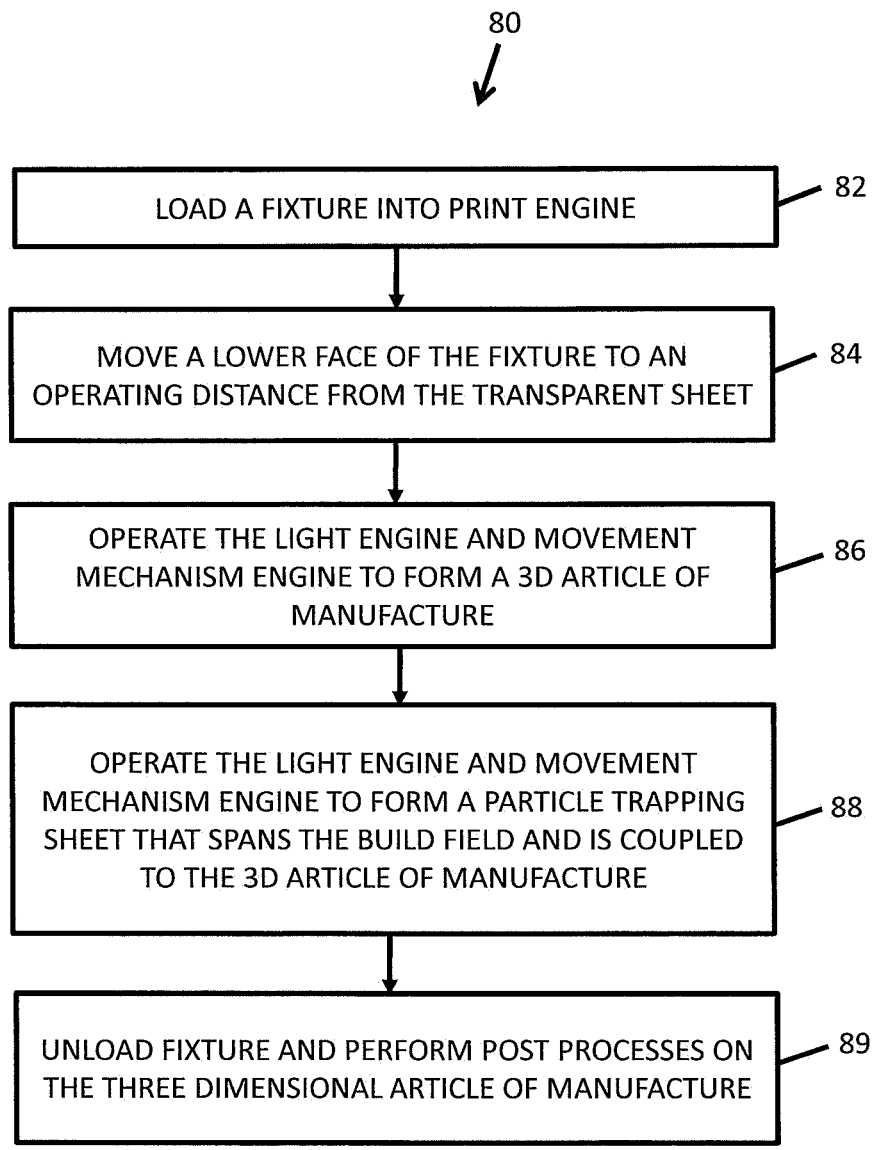
FIG. 6B is a flowchart depicting a second embodiment of a process for operating printing system 2 which corresponds to FIG. 2B.

FIG. 6B is a flowchart depicting a process 80 for operating printing system 2 to fabricate a three dimensional article of manufacture 26. All steps of this process are executed by control server 14 and print engine controller 48 that control portions of printing system 2 and print engine 6. Process 80 corresponds to the description of FIG. 2B.

According to step 82, the transport mechanism 12 retrieves a fixture 40 from a fixture cassette 4 and loads it into a print engine 6. The fixture 40 has a lower face 45 that faces downwardly.

According to step 84, the movement mechanism lowers and positions the lower face 45 of fixture 40 at the build plane 36. The build plane 36 is at an operating distance from the transparent sheet 20. According to step 86, the print engine controller 48 operates the light engine 24 and the vertical movement mechanism 38 to form a three dimensional article of manufacture 26.

According to step 88, the print engine controller 48 operates the light engine 24 and the vertical movement mechanism 38 to form a particle trapping sheet 50 as is illustrated in FIG. 2B or FIG. 5B. The particle trapping sheet 50 preferably spans the entire build plane 36. The particle trapping sheet 50 is coupled to the three dimensional article of manufacture 26 via extensions 54. The extensions 54 form a framework for properly supporting the particle trapping sheet 50 in the vessel 24.

According to step 89, the transport mechanism unloads the fixture 40 from the print engine 6 and additional processes are performed. These additional processes can include post processing, inspection, and removal of the particle trapping sheet 50 from the three dimensional article of manufacture 26. In one embodiment the transport mechanism 12 sequentially transfers the fixture 40 to different post process stations 8 and inspection stations 10. When the particle trapping sheet 50 is removed it separates along an interface between the distal ends 66 of extensions 54 and the three dimensional article of manufacture 26.

In an alternative embodiment the print engine 6 is a standalone unit and steps 82 and 89 are performed manually. This includes manual loading and unloading of fixture 40 as well as cleaning, drying, UV curing, inspection, and removal of the particle trapping sheet 50.

Figure 6C:
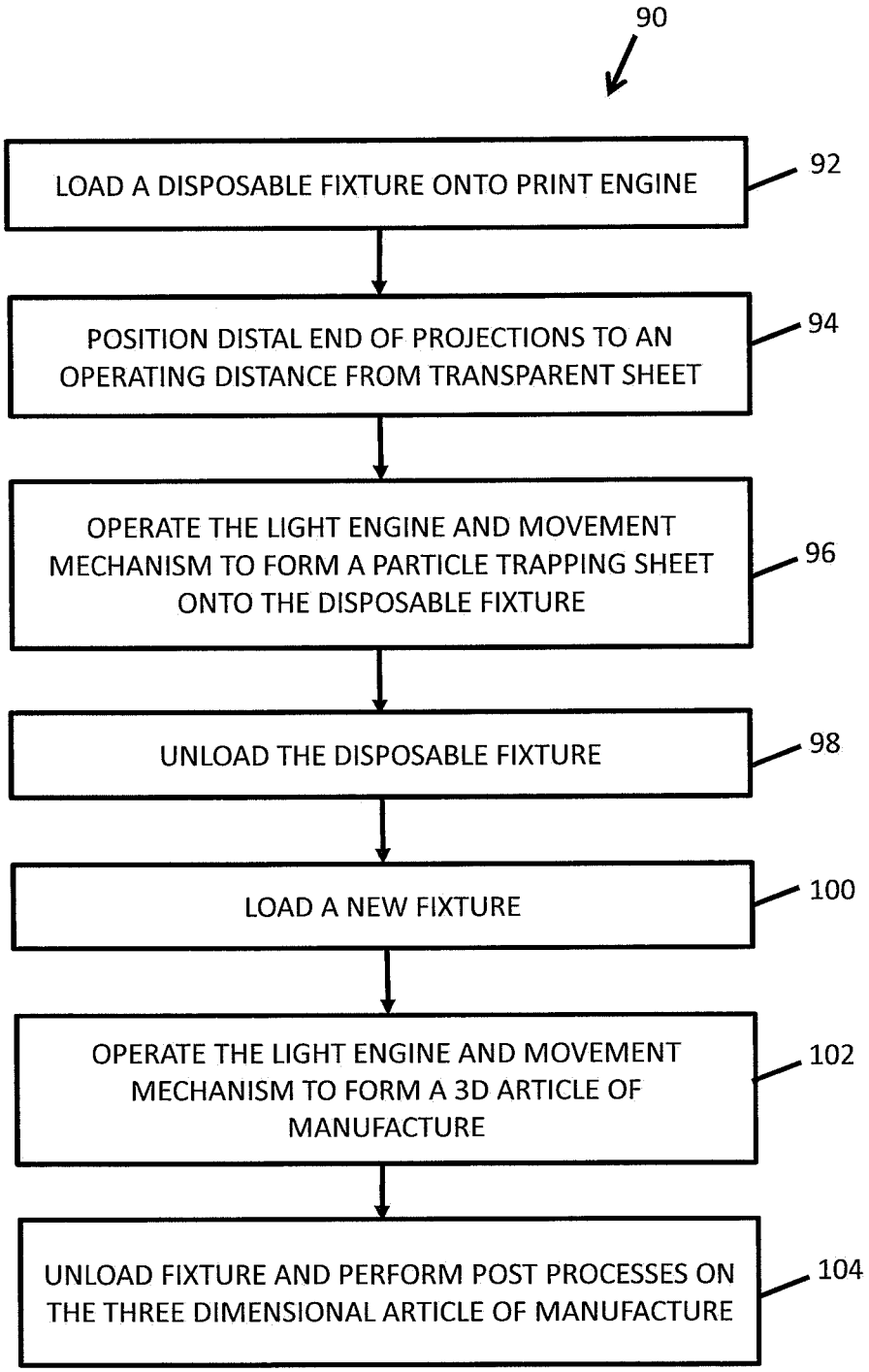
FIG. 6C is a flowchart depicting a third embodiment of a process for operating printing system 2 which corresponds to FIG. 2C.

FIG. 6C is a flowchart depicting a process 90 for operating printing system 2 to fabricate a three dimensional article of manufacture 26. All steps of this process are executed by control server 14 and print engine controller 48 that control portions of printing system 2 and print engine 6. Process 90 corresponds to the description of FIG. 2C.

According to step 92, the transport mechanism 12 retrieves a disposable fixture 40 from a fixture cassette and loads it into a print engine 6. The fixture can be an embodiment that is similar to that discussed with respect to FIG. 2C, FIG. 3, or FIG. 4. Upon loading the fixture 40 into print engine 6, the movement mechanism 38 can engage and vertically position the fixture 40.

According to step 94, the movement mechanism 38 lowers and positions the fixture 40 whereby the distal ends 58 of projections 46 are positioned at build plane 36. Build plane 36 is at an operating distance from the transparent sheet 20.

According to step 96, the print engine controller 48 operates the light engine 24 and the vertical movement mechanism 38 to form a particle trapping sheet 50 as is illustrated in FIG. 2C. The particle trapping sheet 50 preferably spans essentially the entire build plane 36 and is coupled to all of the projections 46. Formation of the particle trapping sheet traps loose particles that are primarily solidified photocurable resin.

According to step 98, the transport mechanism unloads the disposable fixture 40 from the print engine 6. According to step 100, the transport mechanism loads a new fixture 40 into the print engine 6. According to step 102, the print engine controller 48 operates the light engine 24 and the vertical movement mechanism 38 to form a three dimensional article of manufacture 26.

According to step 104, the transport mechanism unloads the fixture 40 from the print engine 6 and additional processes are performed. These additional processes can include post processing, and inspection. In one embodiment the transport mechanism 12 sequentially transfers the fixture 40 to different post process stations 8 and inspection stations 10.

Figure 7A:
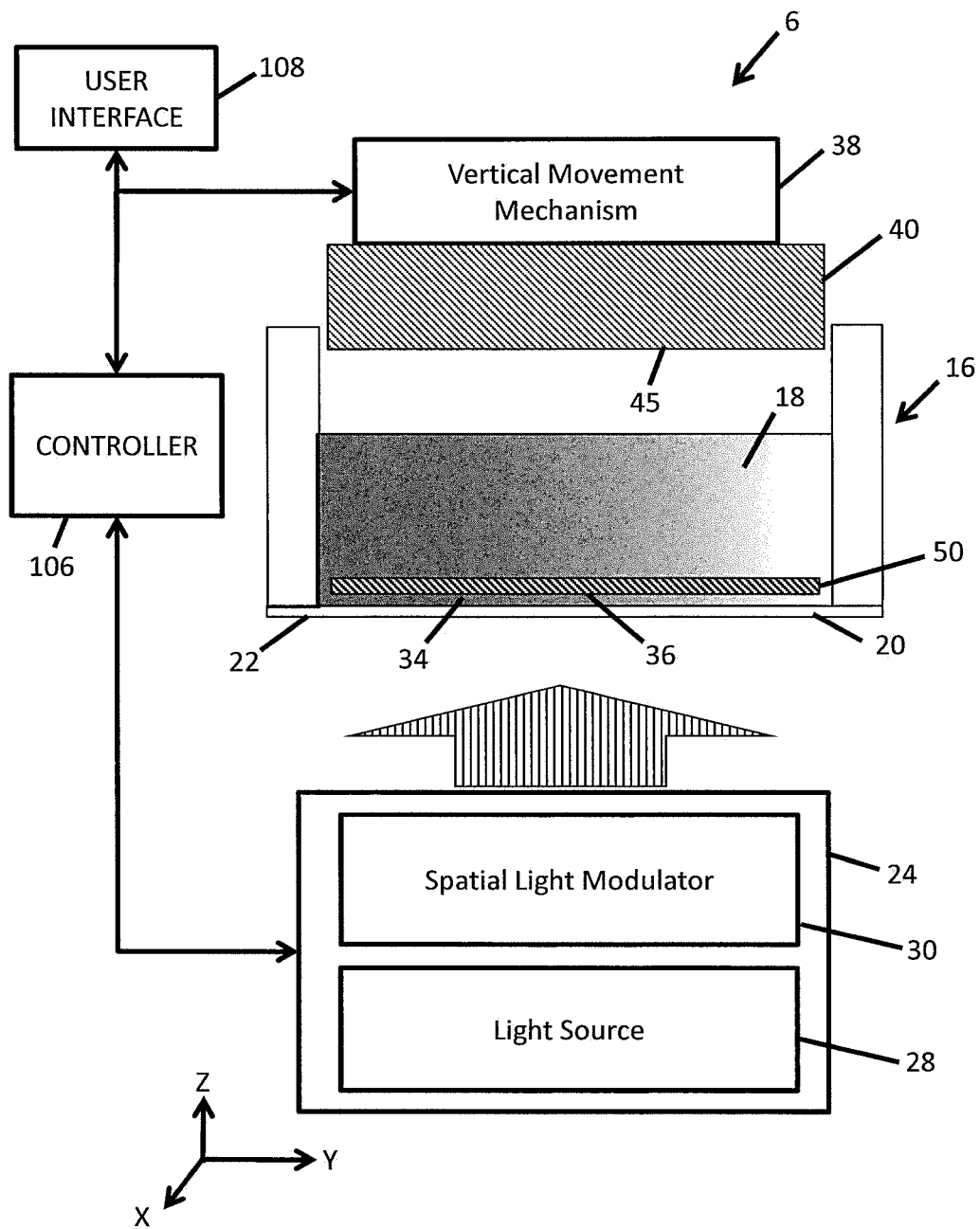
FIG. 7A is a schematic block diagram depicting an embodiment of a standalone print engine forming a particle trapping sheet.
Figure 7B:
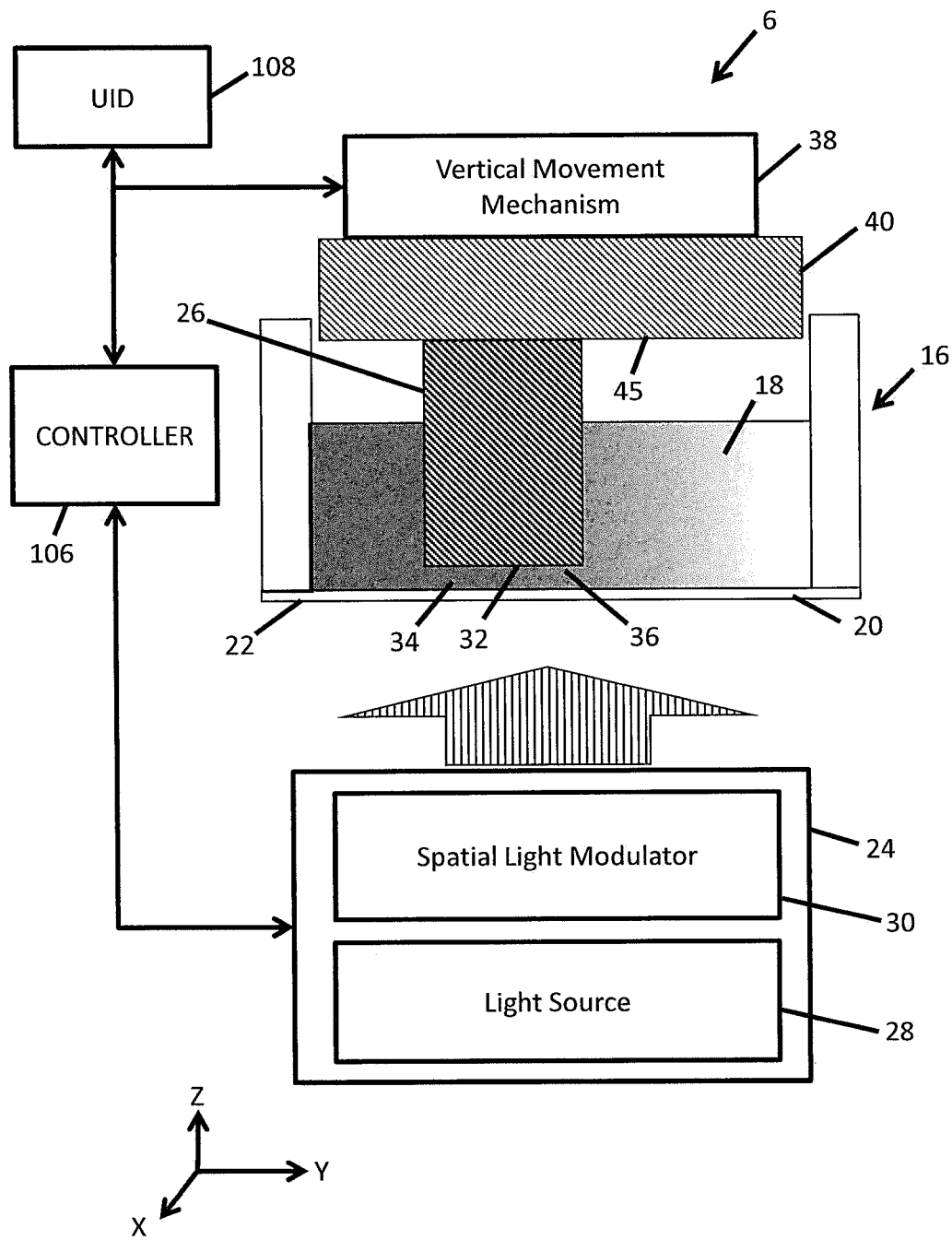
FIG. 7B is a schematic block diagram depicting an embodiment of a standalone print engine manufacturing a three dimensional article.

FIGS. 7A and 7B are schematic block diagrams depicting an embodiment of a standalone print engine 6 for manufacturing a three dimensional article 26. FIGS. 7A and 7B illustrate two stages of a manufacturing process. The element numbers shown in FIGS. 7A and 7B are the same as those depicted in FIG. 2A except as discussed infra.

A controller 106 is configured to control the light engine 24, the vertical movement mechanism 38, and to control and/or receive signals from other portions of the print engine 6. The controller 106 is coupled to a user interface device 108. User interface device (referred hereinafter as UID 108) can be a touchscreen permanently coupled to the standalone print engine 6. Alternatively, the UID 108 can have either a wireless or wired connection to the controller 106. The UID can also be a laptop computer, a smartphone, a personal digital assistant (PDA), a tablet computer, a desktop computer, a floor standing computer, or any client device accessible by a user.

FIG. 7A depicts a first stage of a manufacturing process during which the light engine 24 is forming a particle trapping sheet 50 at the build plane 36. This is illustrated as taking place while the lower face 45 of fixture 40 is not immersed in the photocurable resin 18. FIG. 7B depicts a second stage of the manufacturing process during which operation of the light engine 24 and the movement mechanism 38 are manufacturing a three dimensional article 26.

Figure 8:
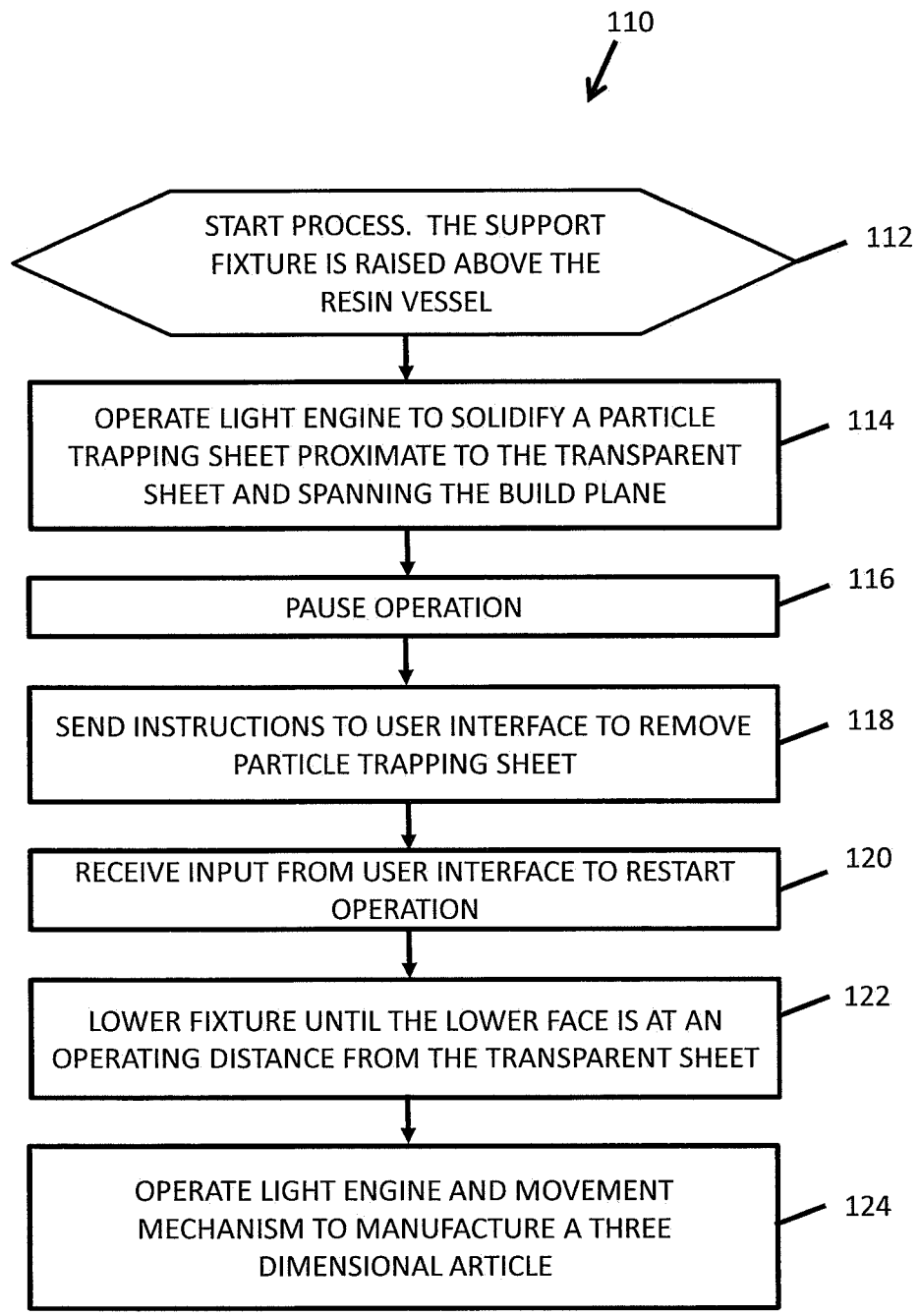
FIG. 8 is a flowchart depicting an embodiment of a method of manufacturing a three dimensional article.

FIG. 8 depicts a method 110 of manufacturing a three dimensional article 26. The steps of method 110 are generally performed by the controller 106. According to element 112, the method starts with the fixture 40 raised above the resin vessel 16. Alternatively, the fixture 40 is positioned whereby the build plane 36 is disconnected from the fixture 40 and is not connected to the lower face 45 of fixture 40.

According to step 114, the light engine is operated to solidify a particle trapping sheet 50 proximate to the transparent sheet 20 as depicted in FIG. 7A. Any particles that project up from the transparent sheet are "captured" by the particle trapping sheet 50. The particle trapping sheet is disconnected from the transparent sheet 20 and disconnected from fixture 40.

According to step 116, operation of the print engine 6 is paused. According to step 118, instructions are sent to UID 108 whereby the UID displays instructions to the user of print engine 6 to remove the particle trapping sheet 50 from the resin vessel 16. After removing the particle trapping sheet, the user provides an input to the UID 108. According to step 120, the input is received from the UID which signals the controller 106 to restart operation of print engine 6.

According to step 122, the movement mechanism 38 is operated to move the lower face 45 of fixture 40 to the build plane 36. According to step 124, the light engine 24 and the movement mechanism 38 are operated to manufacture the three dimensional article 26 as depicted in FIG. 7B.

Variations and/or portions of method 110 can be used. In one embodiment, steps 112, 114, and 118 can be utilized after a particle-based failure is diagnosed. In another embodiment, steps 112, 114, and 118 can be performed as preventative maintenance that can have a fixed periodic schedule. Other variations are possible that can include more or fewer steps of method 110.

Figure 9A:
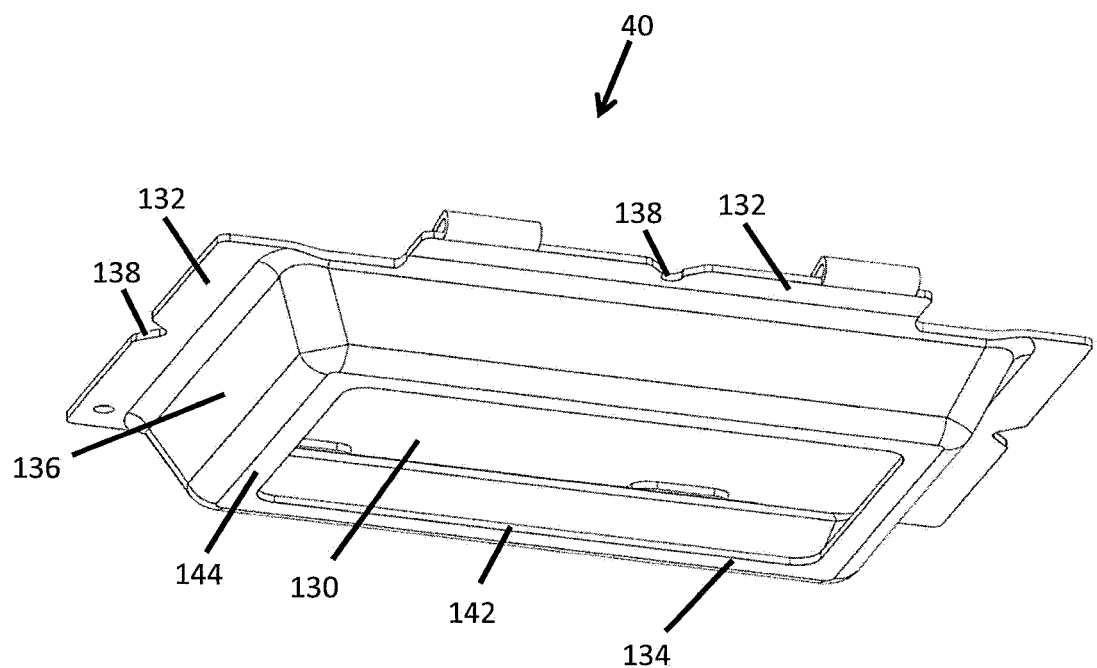
FIG. 9A is an isometric drawing of an alternative embodiment of a support fixture having a central opening.
Figure 9B:
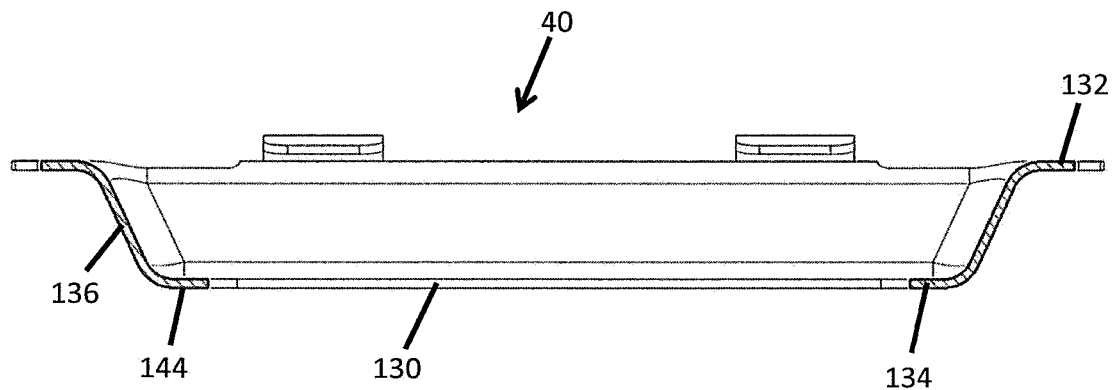
FIG. 9B is a side cutaway view of the support fixture of FIG. 9A.

FIGS. 9A and 9B are isometric and side cutaway views of an alternative embodiment of a support fixture 40 having a central opening 130. Support fixture 40 includes an upper portion 132 coupled to a lower rim 134 by a sidewall 136. The upper portion 132 defines interface features 138 for interfacing (aligning and coupling) the support fixture 40 with the vertical movement mechanism 38. The sidewall 136 can include openings (not shown) for facilitating movement and draining of the photocurable resin 18 as the lower rim 134 is raised out of the vessel 16.

The lower rim 134 includes an inner edge 142 that bounds the central opening 130. The central opening 130 spans most or all of the area of the build plane 36. The lower rim 134 defines a downwardly facing planar surface 144 that overlays an outer peripheral portion of the build plane 36.

Figure 10A:
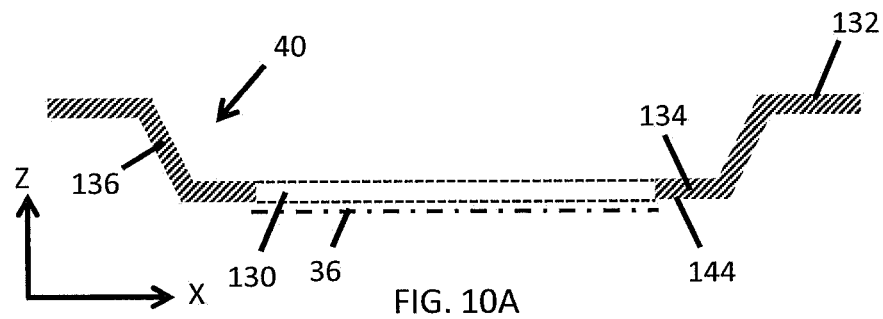
FIG. 10A is a cross-sectional view of the support fixture of FIG. 9A.
Figure 10B:
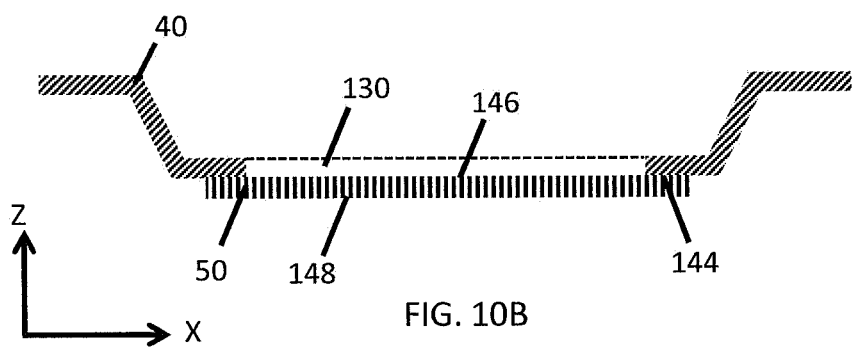
FIG. 10B is a cross-sectional view of the support fixture of FIG. 10A with an addition of a particle trapping sheet.
Figure 10C:
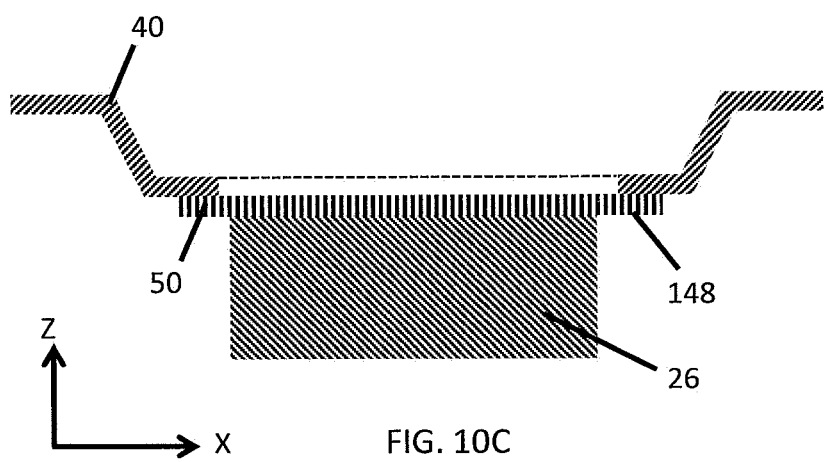
FIG. 10C is a cross-sectional view of the support fixture of FIG. 10A with additions of a particle trapping sheet and a three dimensional article.

FIGS. 10A-C are a sequence of diagrams representing a vertical cross-section through the support fixture 40 and the three-dimensional article 26 during a manufacturing process. FIG. 10A depicts the support fixture 40 with central opening 130 before the process has started. As part of the process, the lower planar surface 144 of lower rim 134 is positioned at or proximate to the build plane 36.

According to FIG. 10B, a particle trapping sheet 50 is formed that spans the central opening 130 and is attached to the lower planar surface 144. The particle trapping sheet 50 is preferably at least one millimeter thick in the vertical direction to provide adequate support for the subsequent formation of the three dimensional article 26. Thus, sheet 50 had a dual role of trapping particles and providing support for the three dimensional article 26. Sheet 50 preferably includes an array of conduits that pass vertically therethrough to allow resin to pass vertically through the conduits. The conduits can define openings on an upper surface 146 and a lower surface 148 of the sheet 50. The openings can have varying shapes such as circular, square, rectangular, polygonal, or irregular. In one embodiment, the openings are hexagonal and can form a hexagonal close packed (HCP) pattern across the upper 146 and/or lower 148 surface of the sheet 50.

According to FIG. 10C, a three dimensional article 26 is formed onto and downward from the lower surface 148 of the sheet 50. After the three dimensional article 26 is formed, the sheet 50 can be separated from the surface 144 and then the article 26 can be separated from the sheet 50.

Figure 11:
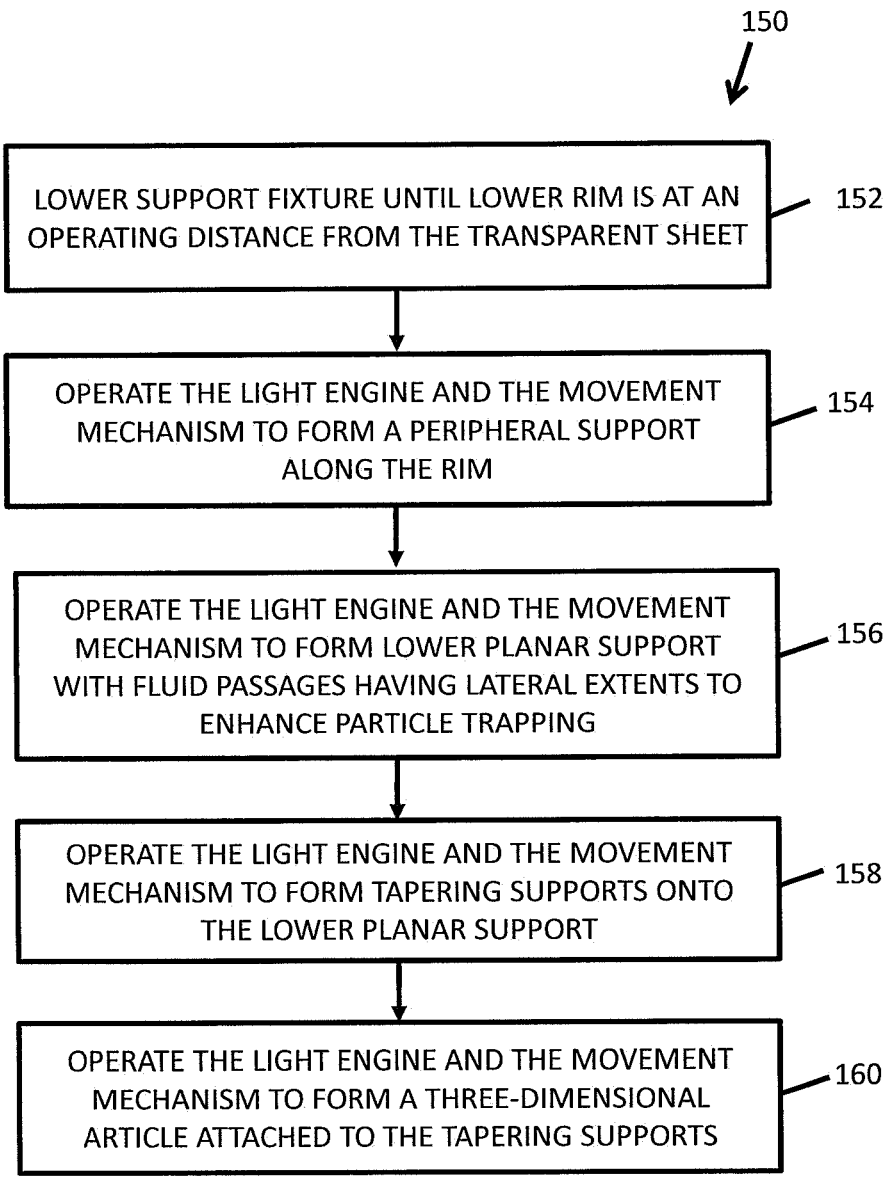
FIG. 11 is a flowchart that represents an embodiment of a method for manufacturing a three dimensional article that utilizes the support fixture 40 of FIGS. 9A and 9B.

FIG. 11 is a flowchart that represents an embodiment of a method 150 for manufacturing a three dimensional article 26 that utilizes the support fixture 40 depicted in FIGS. 9A and 9B. The particle trapping sheet depicted by method 150 is depicted in any of FIGS. 12-14.

According to 152, the vertical movement mechanism 38 is operated to position the planar surface 144 at the build plane 36. According to 154, movement mechanism 38 and the light engine 24 are operated to form a peripheral support upon the planar surface 144. The peripheral support provides two functions: (1) an attachment support for sheet 50 and (2) adjust for possible inaccuracies in vertical tolerances. The latter is a result of the difficultly in accurately positioning the planar surface 144 exactly at the build plane 36.

According to 156, the movement mechanism 38 and the light engine 24 are operated to form a particle trapping sheet 50 attached to the peripheral support and spanning the opening 130. The particle trapping sheet 50 includes fluid passages having lateral geometric aspects that enhance particle trapping.

According to 158, the movement mechanism 38 and the light engine 24 are operated to form tapering supports 52 onto the lower planar support. According to 160, the movement mechanism 38 and the light engine 24 are operated to form the three dimensional article 26 attached to the tapering supports. Steps 158 and 160 can be performed sequentially and/or concurrently.

Figure 12:
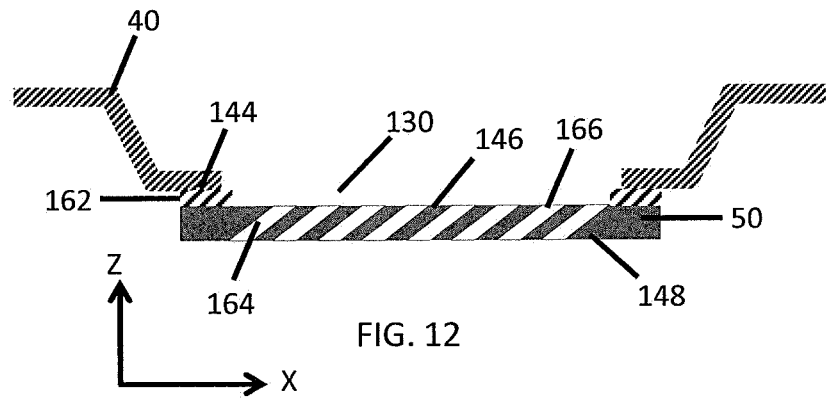
FIG. 12 is a cross-sectional view of a support fixture with a first embodiment of a particle trapping sheet that can be formed according to steps 152-156 of method 150 of FIG. 11.

FIG. 12 is a cross-sectional view of a support fixture 40 with a first embodiment of a particle trapping sheet 50 that can be formed according to steps 152-156 of method 150. A peripheral support 162 has been formed onto the planar surface 144 according to step 154 of method 150. The particle trapping sheet 50 has been formed to span opening 130 and onto the peripheral support 162.

In the illustrated embodiment, the particle trapping sheet 50 defines an array of conduits 164 that allow resin to flow through the particle trapping sheet 50 as the movement mechanism 38 raises and lowers the support fixture 40. The illustrated conduits 164 are oriented at an oblique angle with respect to vertical axis Z in order to more completely trap particles. The conduits 164 define openings 166 on the upper 146 and lower 148 surfaces of sheet 50.

Figure 13:
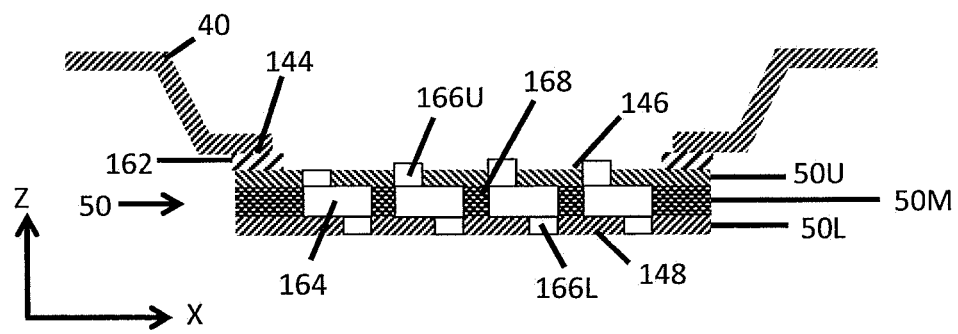
FIG. 13 is a cross-sectional view of a support fixture with a second embodiment of a particle trapping sheet that can be formed according to steps 152-156 of method 150 of FIG. 11.

FIG. 13 is a cross-sectional view of a support fixture 40 with a second embodiment of a particle trapping sheet 50 that can be formed according to steps 152-156 of method 150. A peripheral support 162 has been formed onto the planar surface 144 according to step 154 of method 150. The particle trapping sheet 50 has been formed to span opening 130 and onto the peripheral support 162.

In the illustrated embodiment, the particle trapping sheet 50 is formed from three layers including an upper sheet 50U, a middle portion 50M, and a lower sheet 50L. The upper sheet 50U defines an array of upper openings 166U. The lower sheet defines an array of lower openings 166L. The upper 166U and lower 166L openings are offset from each other to reduce a chance that particles can escape from being trapped in one of the upper 50U and lower 50L sheets. The middle portion 50M defines ribs or beams 168 that help to rigidify the sheet 50 to allow it to support a three dimensional article 26. The middle portion 50M also fluidically couples the upper 166U and lower 166L openings. Thus, the three layers of sheet 50 define conduits 164 that pass from the upper surface 146 to the lower surface 148.

Figure 14:
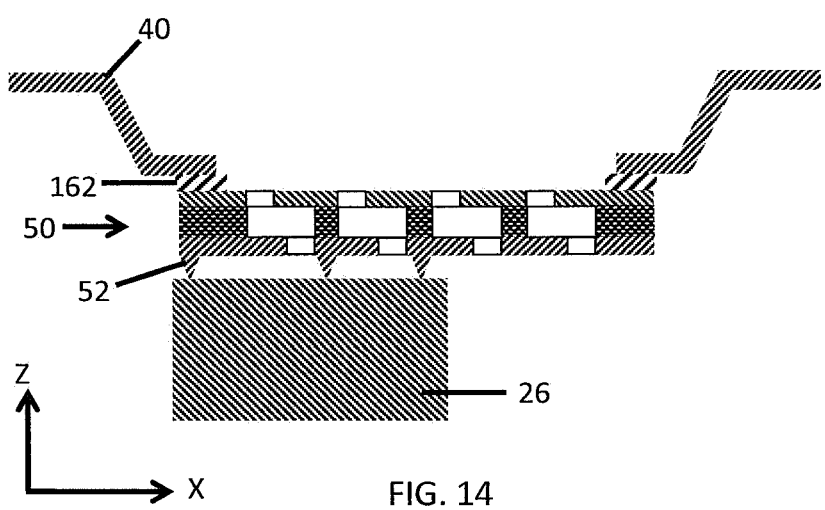
FIG. 14 is cross sectional view of a support fixture with a third embodiment of a particle trapping sheet that can be manufactured according to the method 150 of FIG. 11.

FIG. 14 is a cross-sectional view of the support fixture 40 with a third embodiment of a particle trapping sheet 50 formed according to method 150. In this illustrated embodiment, sheet 50 includes tapering supports 52 coupled to the three dimensional article 26. Otherwise, the third embodiment of FIG. 14 is similar to the second embodiment of FIG. 13.

Figure 15A:
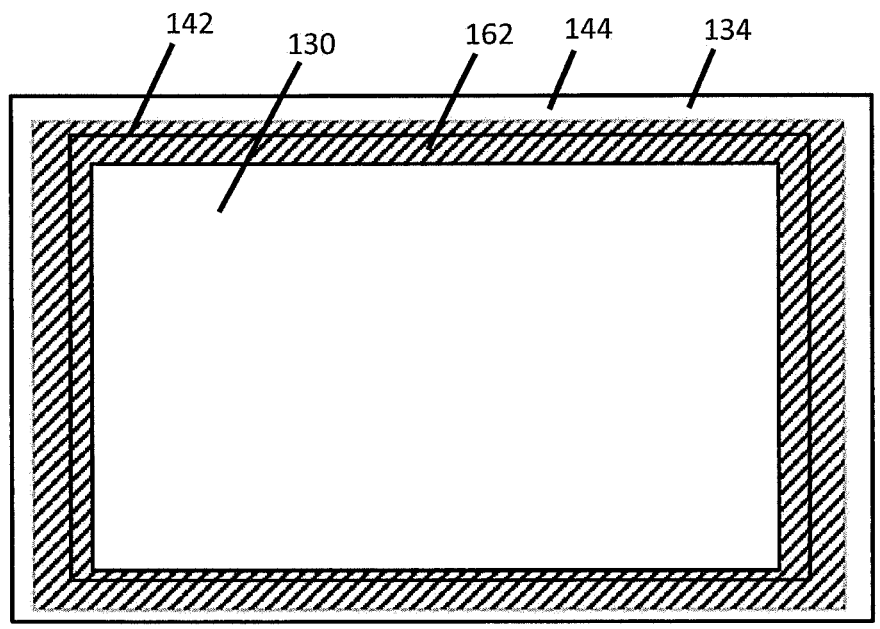
FIG. 15A depicts a peripheral support that has been formed onto a support fixture.

FIGS. 15A-D illustrate steps 154 and 156 of method 150 and correspond to the particle trapping sheet 50 of either FIG. 13 or FIG. 14. FIG. 15A depicts the peripheral support 162 that has been formed upon the lower planar surface 144 of the lower rim 134. While the peripheral support 162 is illustrated as being a rectangular frame in shape, it may be more effective if it has a stepped or a zig-zag geometry around the edge 142.

Figure 15B:
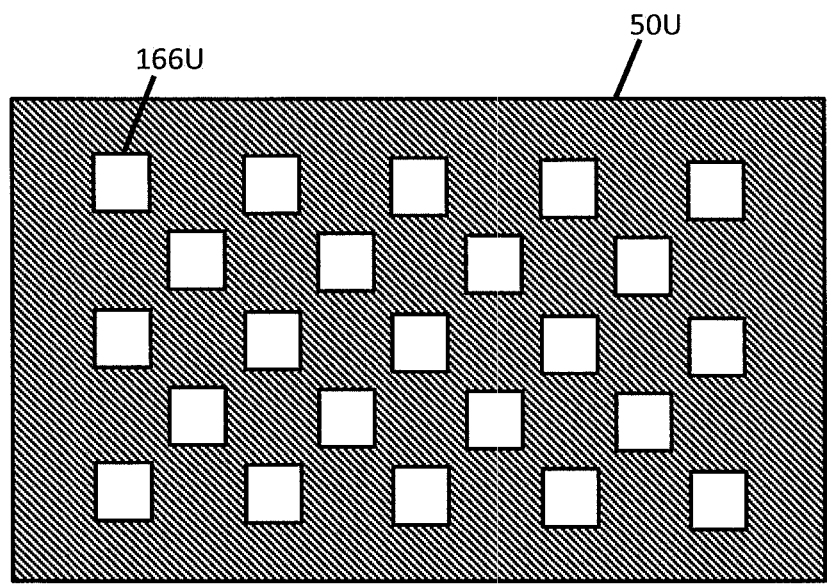
FIG. 15B depicts an upper layer of a particle trapping sheet.
Figure 15C:
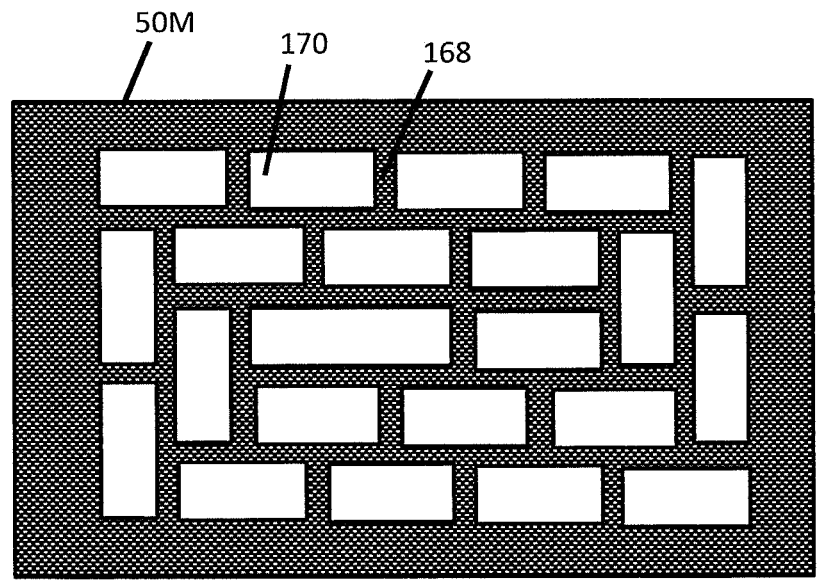
FIG. 15C depicts a middle layer of a particle trapping sheet.
Figure 15D:
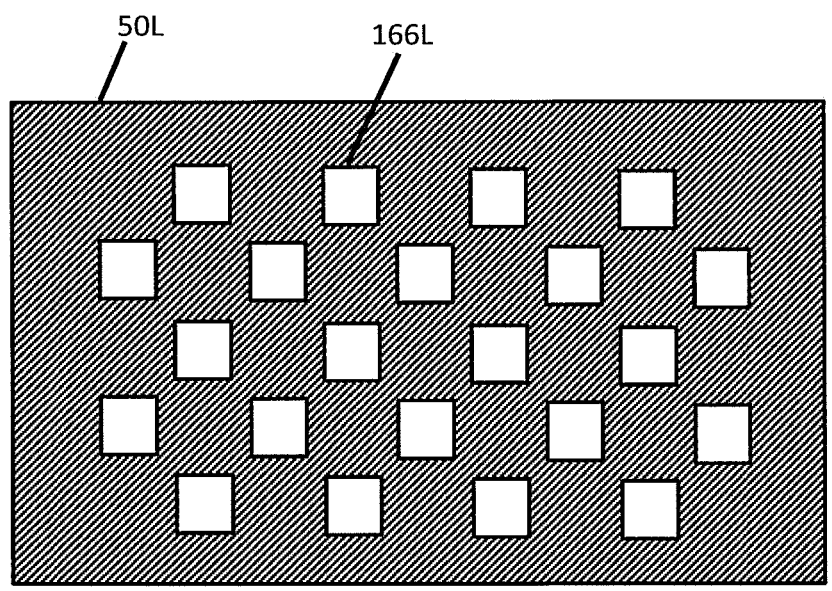
FIG. 15D depicts a lower layer of a particle trapping sheet.

FIG. 15B depicts an upper layer 50U of particle trapping sheet 50 with upper openings 166U. FIG. 15C depicts the middle layer 50M of sheet 50. FIG. 15D depicts the lower layer with lower openings 166L. The upper 166U and lower 166L openings are laterally offset from each other to enhance particle trapping. The middle layer defines fluid passages 170 that couple the upper 166U and lower 166L openings. Also, support ribs 168 are defined between the fluid passages 170.

The specific embodiments and applications thereof described above are for illustrative purposes only and do not preclude modifications and variations encompassed by the scope of the following claims.

What I claim is:

1. A three dimensional printing system for manufacturing a three dimensional article comprising:
   a resin vessel for containing a photocurable resin and having a lower portion with a transparent sheet;
   a light engine configured to selectively project radiation up through the transparent sheet and over a build plane;
   a movement mechanism;
   a support fixture coupled to the movement mechanism and including:
      an upper portion for coupling to the movement mechanism;
      a lower portion with a rim surrounding a central opening; and
      a side wall coupling the upper and lower portions of the support fixture;
   a controller configured to:
      (1) operate the movement mechanism to position the rim at an operating distance from the transparent sheet;
      (2) operate the light engine and the movement mechanism to form a particle trapping sheet that spans the central opening; and
      (3) operate the light engine and the movement mechanism to form the three dimensional article onto and below the particle trapping sheet.

2. The three dimensional printing system of claim 1 wherein the controller is further configured to operate the light engine to form a peripheral support along the rim between steps (1) and (2).

3. The three dimensional printing system of claim 1 wherein the particle trapping sheet includes tapering features that taper between the particle trapping sheet and the three dimensional article to facilitate removal of the three dimensional article from the particle trapping sheet.

4. The three dimensional printing system of claim 1 wherein the particle trapping sheet defines an array of conduits to allow resin to flow through the particle trapping sheet and through the central opening as the movement mechanism raises and lowers the support fixture.

5. The three dimensional printing system of claim 4 wherein the conduits individually are at least partially oriented at an oblique angle with respect to a vertical axis to facilitate complete trapping of particles.

6. The three dimensional printing system of claim 4 wherein the conduits individually define an upper opening on an upper side of the particle trapping sheet and a lower opening on a lower side of the particle trapping sheet, the upper and lower openings are laterally offset to facilitate trapping of particles.

7. The three dimensional printing system of claim 1 wherein the particle trapping sheet has a vertical thickness of at least one millimeter to provide structural support for the three dimensional article.

8. The three dimensional printing system of claim 1 wherein the particle trapping sheet includes a plurality of support ribs to provide structural support for the three dimensional article.

9. The three dimensional printing system of claim 8 wherein the support ribs are defined between an upper sheet and a lower sheet that are thinner vertically than the support ribs.

10. A method of manufacturing a three dimensional article using a three dimensional printing system including a resin vessel for containing a photocurable resin and having a lower portion with a transparent sheet, a light engine configured to selectively project radiation up through the transparent sheet and over a build plane, a movement mechanism, a support fixture coupled to the movement mechanism, and a controller, the support fixture further including an upper portion for coupling to the movement mechanism, a lower portion with a rim surrounding a central opening, and a side wall coupling the upper and lower portions of the support fixture, the method comprising:

(1) positioning the rim at an operating distance from the transparent sheet;
(2) operating the light engine and the movement mechanism to form a particle trapping sheet that spans the central opening; and
(3) operating the light engine and the movement mechanism to form the three dimensional article onto the particle trapping sheet.

11. The method of claim 10 further comprising forming a peripheral support along the rim between steps (1) and (2).

12. The method of claim 10 wherein the forming the particle trapping sheet includes forming tapering features that taper from the particle trapping sheet to the three dimensional article.

13. The method of claim 10 wherein the forming the particle trapping sheet includes defining an array of conduits to allow resin to flow through the particle trapping sheet and through the central opening as the movement mechanism raises and lowers the support fixture.

14. The method of claim 13 wherein the conduits individually are at least partially oriented at an oblique angle with respect to a vertical axis to facilitate complete trapping of particles.

15. The method of claim 13 wherein the conduits individually define an upper opening on an upper side of the particle trapping sheet and a lower opening on a lower side of the particle trapping sheet, the upper and lower openings are laterally offset to facilitate complete trapping of particles.

16. The method of claim 10 wherein the particle trapping sheet has a vertical thickness of at least one millimeter to provide structural support for the three dimensional article.

17. The method of claim 10 wherein the particle trapping sheet includes a plurality of support ribs to provide structural support for the three dimensional article.

18. The three dimensional printing system of claim 17 wherein the support ribs are defined between an upper sheet and a lower sheet that are thinner vertically than the support ribs.

19. The method of claim 10 further comprising separating the particle trapping sheet from the three dimensional article.

* * * * *